United States Patent
Nagasaka

(10) Patent No.: US 11,195,517 B2
(45) Date of Patent: Dec. 7, 2021

(54) INFORMATION PROCESSING APPARATUS AND INFORMATION PROCESSING METHOD

(71) Applicant: SONY CORPORATION, Tokyo (JP)

(72) Inventor: Hideo Nagasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 323 days.

(21) Appl. No.: 16/098,142

(22) PCT Filed: Aug. 19, 2016

(86) PCT No.: PCT/JP2016/074223
§ 371 (c)(1),
(2) Date: Nov. 1, 2018

(87) PCT Pub. No.: WO2017/195388
PCT Pub. Date: Nov. 16, 2017

(65) Prior Publication Data
US 2020/0335087 A1    Oct. 22, 2020

Related U.S. Application Data

(60) Provisional application No. 62/335,419, filed on May 12, 2016.

(51) Int. Cl.
*G10L 15/08* (2006.01)
*G06F 3/0488* (2013.01)
*G06F 3/16* (2006.01)

(52) U.S. Cl.
CPC .......... *G10L 15/08* (2013.01); *G06F 3/04883* (2013.01); *G06F 3/16* (2013.01); *G10L 2015/088* (2013.01)

(58) Field of Classification Search
CPC ........ G06F 3/013; G06F 3/167; G06F 3/0482; G06F 2203/0381; G10L 2015/223; G10L 2015/228
See application file for complete search history.

(56) References Cited

U.S. PATENT DOCUMENTS

| | | | |
|---|---|---|---|
| 10,423,303 B1* | 9/2019 | Roach | G06F 3/0482 |
| 2007/0078552 A1* | 4/2007 | Rosenberg | H04W 52/027 700/94 |
| 2008/0211766 A1* | 9/2008 | Westerman | G06K 9/00375 345/156 |

(Continued)

FOREIGN PATENT DOCUMENTS

| | | |
|---|---|---|
| CN | 104842795 A | 8/2015 |
| DE | 102015202740 A1 | 8/2015 |

(Continued)

OTHER PUBLICATIONS

Office Action for JP Patent Application No. 2018-516335, dated May 26, 2020, 05 pages of Office Action and 05 pages of English Translation.

(Continued)

*Primary Examiner* — Matthew H Baker
(74) *Attorney, Agent, or Firm* — Chip Law Group

(57) ABSTRACT

There is provided an information processing apparatus including a data acquisition section that acquires related information related to display information displayed by a display apparatus, and a provision section that, when intent of a voice recognition result is interpreted based on the related information, provides a user with a process result based on an intent interpretation result.

20 Claims, 27 Drawing Sheets

(56) References Cited

U.S. PATENT DOCUMENTS

2014/0019462 A1* 1/2014 Heck ................. G06F 16/20
707/754
2016/0091967 A1* 3/2016 Prokofieva ............. G10L 17/22
345/156

FOREIGN PATENT DOCUMENTS

| JP | 2002-041460 A | 2/2002 |
| --- | --- | --- |
| JP | 2013-205523 A | 10/2013 |
| JP | 2015-151059 A | 8/2015 |
| JP | 2015-531109 A | 10/2015 |
| JP | 2015-191558 A | 11/2015 |
| WO | 2015/146017 A1 | 10/2015 |
| WO | 2016/003510 A1 | 1/2016 |

OTHER PUBLICATIONS

Extended European Search Report of EP Application No. 16901733.2, dated Jul. 15, 2019, 11 pages.

"Google Voice Search Revisited [2013]", Youtube, XP054979210, Sep. 5, 2013, 02 pages.

Kaylene Hong, "China's Alibaba Adds Voice Recognition To Its Taobao App", The Next web, https://thenextweb.com/apps/2013/11/28/chinese-e-commerce-giant-alibaba-adds-voice-recognition-to-its-taobao-app-to-make-shopping-easier/, XP055569680, Nov. 28, 2013, 02 pages.

International Search Report and Written Opinion of PCT Application No. PCT/JP2016/074223, dated Oct. 11, 2016, 02 pages of English translation and 7 pages of ISRWO.

Partial Supplementary European Search Report of EP Patent Application No. 16901733.2, dated Mar. 27, 2019, 14 pages.

"Google Voice Search Revisited [2013]", https://www.youtube.com/watch?v=yiQX-_Y0gms, Mar. 18, 2019, 02 pages.

Hong, et al., "Chinese E-Commerce Giant Alibaba Adds Voice Recognition to its Taobao app to Make Shopping Easier", https://thenextweb.com/apps/2013/11/28/chinese-e-commerce-giant-alibaba-adds-voice-recognition-to-its-taobao-app-to-make-shopping-easier/, Mar. 15, 2019, 02 pages.

* cited by examiner

FIG. 1
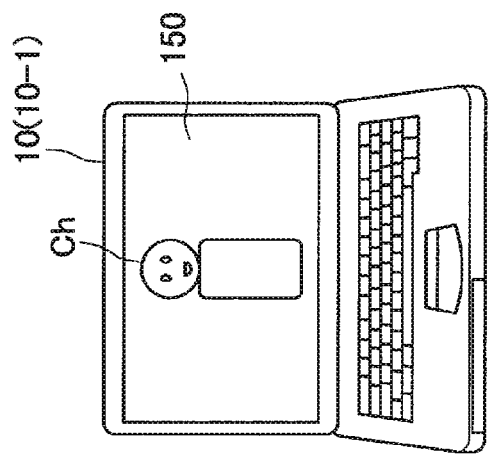
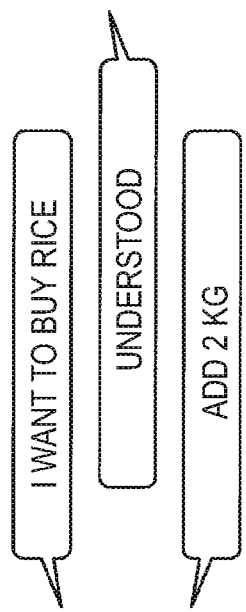
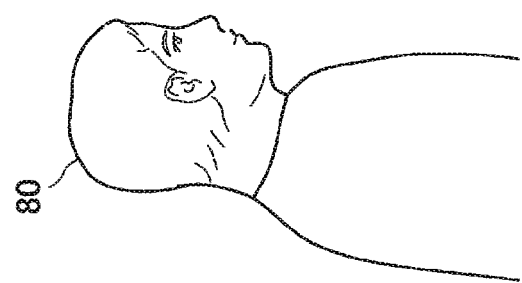

FIG. 24
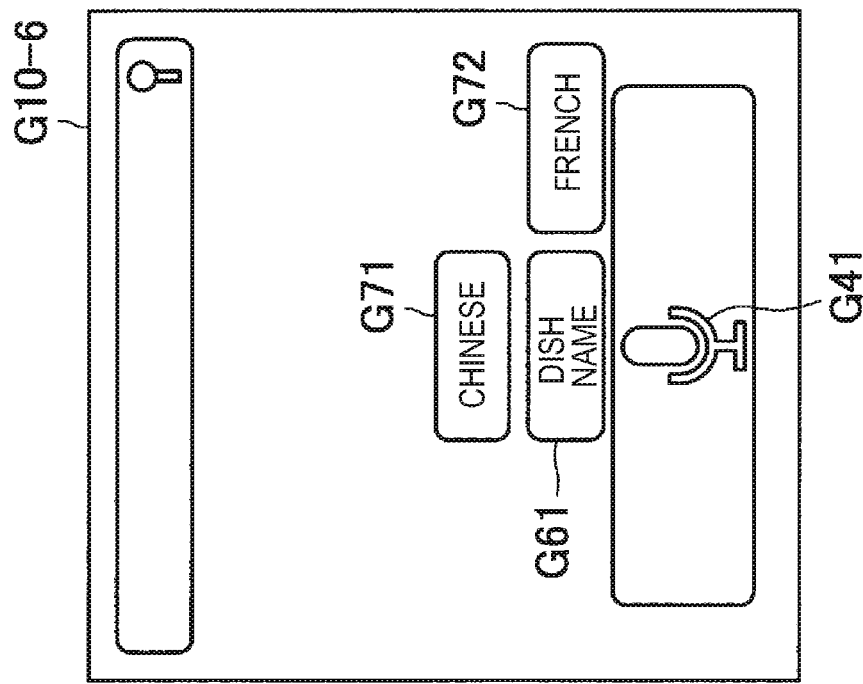
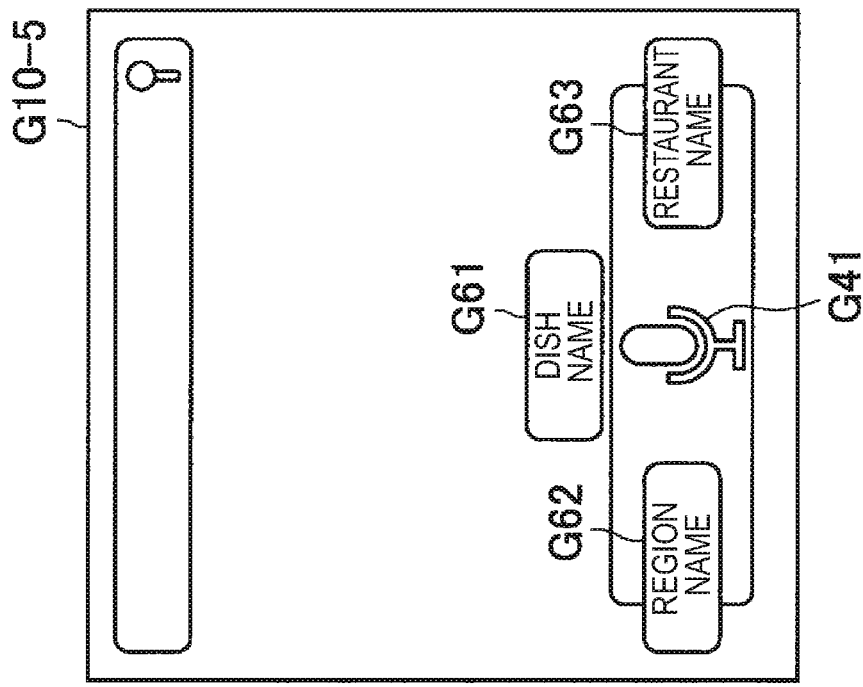

FIG. 25

| CATEGORY (SEARCH TARGET) | CONTENT DISPLAYED BY FLICKING | | |
|---|---|---|---|
| MUSIC | MUSICIAN | MUSICAL COMPOSITION | GENRE |
| TELEVISION | PROGRAM NAME | PERFORMER | |
| MOVIE | GENRE | PERFORMER | MOVIE NAME |
| RESTAURANT | PLACE | RESTAURANT NAME | |
| PRODUCT | PRODUCT NAME | BRAND NAME | |

FIG. 26
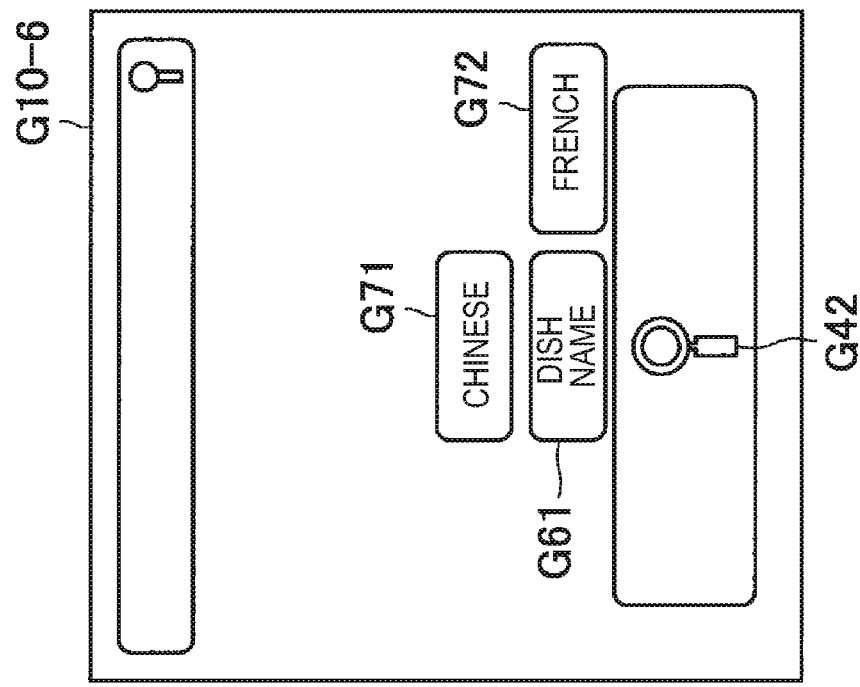
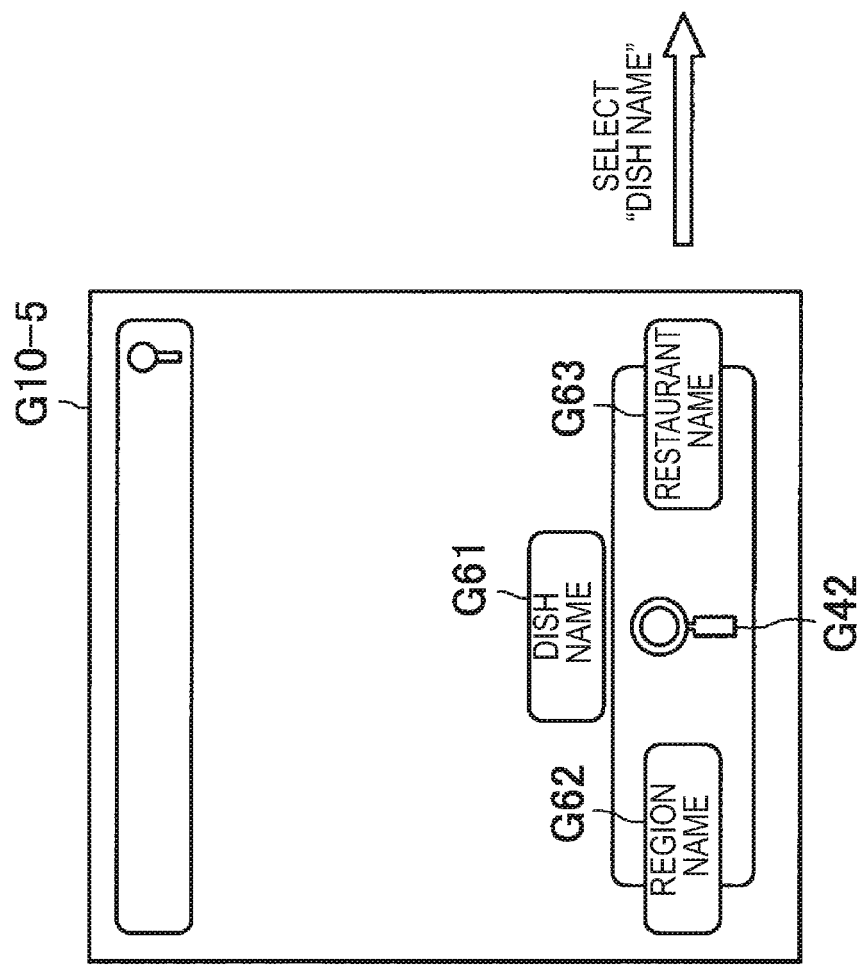

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/074223 filed on Aug. 19, 2016, which claims priority benefit of U.S. Provisional Application 62/335,419 filed in the US Patent Office on May 12, 2016. Each of the above-referenced applications is hereby incorporated herein by reference in its entirety.

TECHNICAL FIELD

The present disclosure relates to an information processing apparatus, an information processing method, and a program.

BACKGROUND ART

In recent years, there has been technology that performs, when a user speaks, a voice recognition process on the user speech, and provides the user with the process result corresponding to a voice recognition result obtained by performing the voice recognition process (see, for example, Patent Literature 1).

CITATION LIST

Patent Literature

Patent Literature 1: JP 2011-253375A

DISCLOSURE OF INVENTION

Technical Problem

However, the intent of user speech can depend on a situation. It is thus desired to provide technology that can enhance the possibility that a process result desired by a user is provided to the user when the process result corresponding to a voice recognition result is provided to the user.

Solution to Problem

According to the present disclosure, there is provided an information processing apparatus including: a data acquisition section configured to acquire related information related to display information displayed by a display apparatus; and a provision section configured to, when intent of a voice recognition result is interpreted in accordance with the related information, provide a user with a process result based on an intent interpretation result.

According to the present disclosure, there is provided an information processing method including: acquiring related information related to display information displayed by a display apparatus; and providing, by a processor, when intent of a voice recognition result is interpreted in accordance with the related information, a user with a process result based on an intent interpretation result.

According to the present disclosure, there is provided a program for causing a computer to function as an information processing apparatus including: a data acquisition section configured to acquire related information related to display information displayed by a display apparatus; and a provision section configured to, when intent of a voice recognition result is interpreted in accordance with the related information, provide a user with a process result based on an intent interpretation result.

Advantageous Effects of Invention

According to the present disclosure as described above, there is provided technology that can enhance the possibility that a process result desired by a user is provided to the user when the process result corresponding to a voice recognition result is provided to the user. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram for describing an overview of an information processing apparatus according to an embodiment of the present disclosure.

FIG. 24 is a diagram for describing a case where a plurality of pieces of attribute information are hierarchically included.

FIG. 25 is a diagram illustrating an example of a search target and the attribute information corresponding to the search target.

FIG. 26 is a diagram for describing a case where a search is conducted on the basis of a search key that is manually input.

MODE(S) FOR CARRYING OUT THE INVENTION

Figure 2:
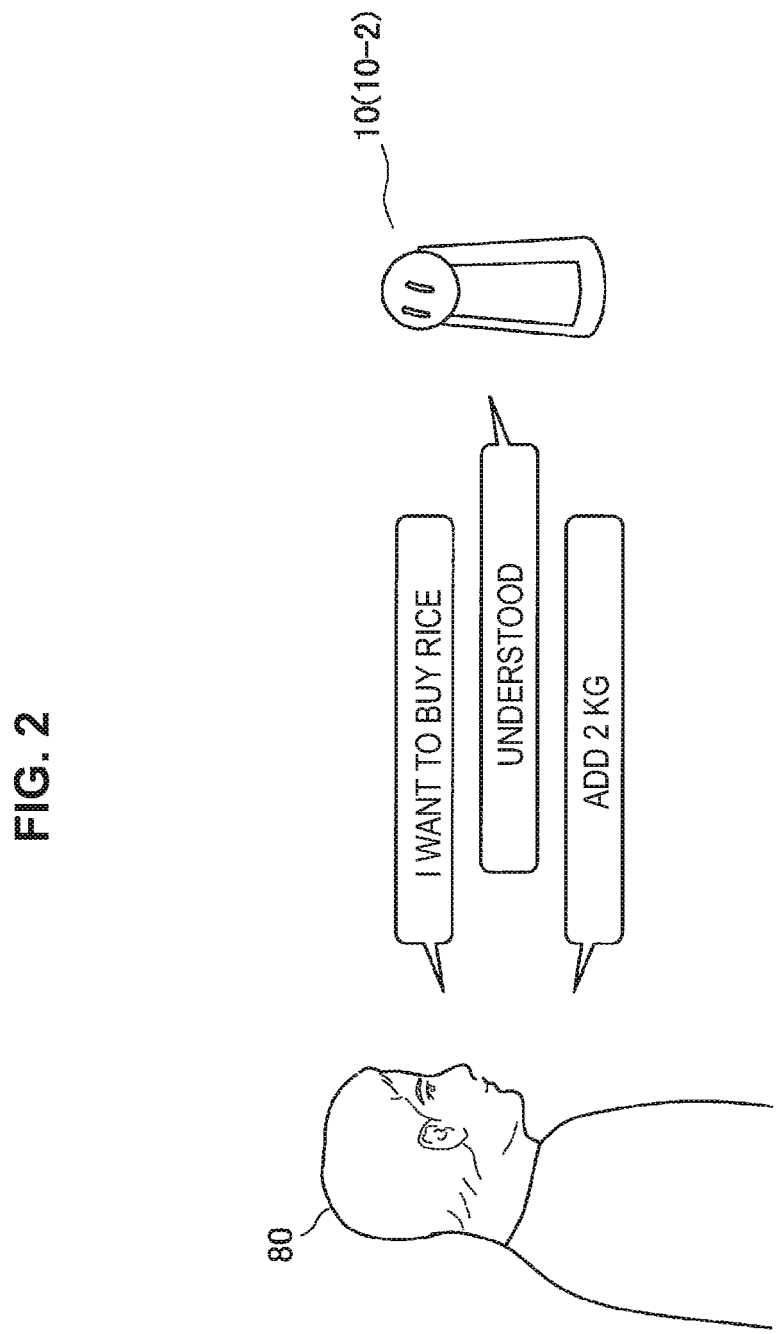
FIG. 2 is a diagram for describing the overview of the information processing apparatus according to the embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different numerals after the same reference sign. However, when there is no need in particular to distinguish structural elements that have substantially the same function and structure, the same reference sign alone is attached.

Note that description will be provided in the following order.
1. Embodiment of the Present Disclosure
1.1. Overview
1.2. Functional Configuration Example
1.3. Detailed Functions
1.3.1. Screen Configuration Example
1.3.2. Dialogue Example When Filtering Products
1.3.3. Screen Configuration Example When Filtering Products
1.3.4. Intent Interpretation Corresponding to Situation
1.3.5. Dialogue according to Whether or Not Display Information Is Watched
1.3.6. Display Example of EC Screen
1.3.7. Filtering Assistance Technology
1.3.8. Selection of Attribute Information
1.3.9. Announcement of Supplemental Information
1.4. Hardware Configuration Example
1.5. Supplemental Information
1.5.1. Details of modification for math calculation
1.5.2. Supplemental Notes 1
1.5.3. Supplemental Notes 2
1.5.4. Supplemental Notes 3
1.5.5. Supplemental Notes 4
1.5.6. Supplemental Notes 5
1.5.7. Supplemental Notes 6
1.5.8. Supplemental Notes 7
1.5.9. Supplemental Notes 8
1.5.10. Supplemental Notes 9
1.5.11. Supplemental Notes 10
1.5.12. Supplemental Notes 11

1. Embodiment of the Present Disclosure

[1.1. Overview]

First, the overview of an information processing apparatus according to an embodiment of the present disclosure will be described with reference to the drawings. FIGS. 1 and 2 are diagrams for describing the overview of the information processing apparatus according to an embodiment of the present disclosure. As illustrated in FIGS. 1 and 2, an embodiment of the present disclosure has an information processing apparatus 10 and a user 80.

Note that the present specification chiefly assumes the case where the information processing apparatus 10 functions as an agent (the present specification refers to the information processing apparatus as agent in some cases.). Here, the agent can be an apparatus that receives voice (which will also be referred to as "user speech" below.) of a user as voice information, and provides the user with the process result corresponding to a voice recognition result for this voice information.

The agent 10 can be implemented as a personal computer (PC) agent 10-1 as illustrated in FIG. 1. In the example illustrated in FIG. 1, a display section 150 displays a character image Ch of the agent. Alternatively, the agent 10 can also be implemented as a robotic agent 10-2 as illustrated in FIG. 2. The following chiefly describes an example in which the agent 10 is implemented by the PC agent 10-1, but an example in which the agent 10 is implemented by the robotic agent 10-2 will also be described as needed.

In recent years, elderly people, in most cases, who have difficulty in using electronic devices such as personal computers (PCs) and mobile devices have desired technology that allows anyone to easily do shopping by using the Internet. To achieve this technology, it is necessary to provide a service that allows a user to purchase a product through a dialogue (dialogue in natural language, in particular) between the user and the agent 10 as illustrated in FIGS. 1 and 2 without operating a difficult graphical user interface (GUI) or the like.

For example, as such a service, a service is estimated to be imaged in general that allows a user to purchase a target rice by only saying "I want to buy rice." However, in fact, in the case where a search is conducted on the basis of the user speech "I want to buy rice," a large number of "rices" that are candidates are found. Accordingly, to purchase a target rice, it is necessary to set a plurality of conditions such as the type, quantity, place of origin, and brand of rice.

In the examples illustrated in FIGS. 1 and 2, a user 80 speaks to add a condition about a quantity of "2 kg" to the condition "rice." Like this example, irrespective of a general image, it is difficult for a user to arrive at a target product by using only voice information. Thus, the present specification chiefly proposes technology that makes it possible to easily select and purchase a target product by combining an operation according to voice information with visual information for helping the selection of the target product.

As an example, in the case where a search using the keyword "rice" is conducted on a certain electronic commerce (EC) site, several thousands of candidates are found as search results. That is, to finally purchase a target product, the user has to filter several thousands of candidates to the target product (e.g., one candidate). Specifically, a user has to perform any of the following two types of work on the basis of a main word (e.g, name of a product such as "rice") indicating a product that the user wishes to purchase.

The first work includes work of setting various conditions such as the weight, type and brand of the product, and using the various conditions for search to filter products to the target product only by conducting a search. The second work includes work of similarly using the various conditions for search to filter products to a certain number of products by conducting a search, and selecting products one by one from the list of remaining products to filter the products to the target product.

As shown by these examples, for a user to arrive at a target product on an EC site, it is important to make the user input a main word indicating a target product in the first place, and make the user easily and appropriately input a keyword used as a condition for filtering with this main word as a starting point.

With reference to FIGS. 1 and 2, the overview of the agent 10 has been described.

[1.2. Functional Configuration Example]

Figure 3:
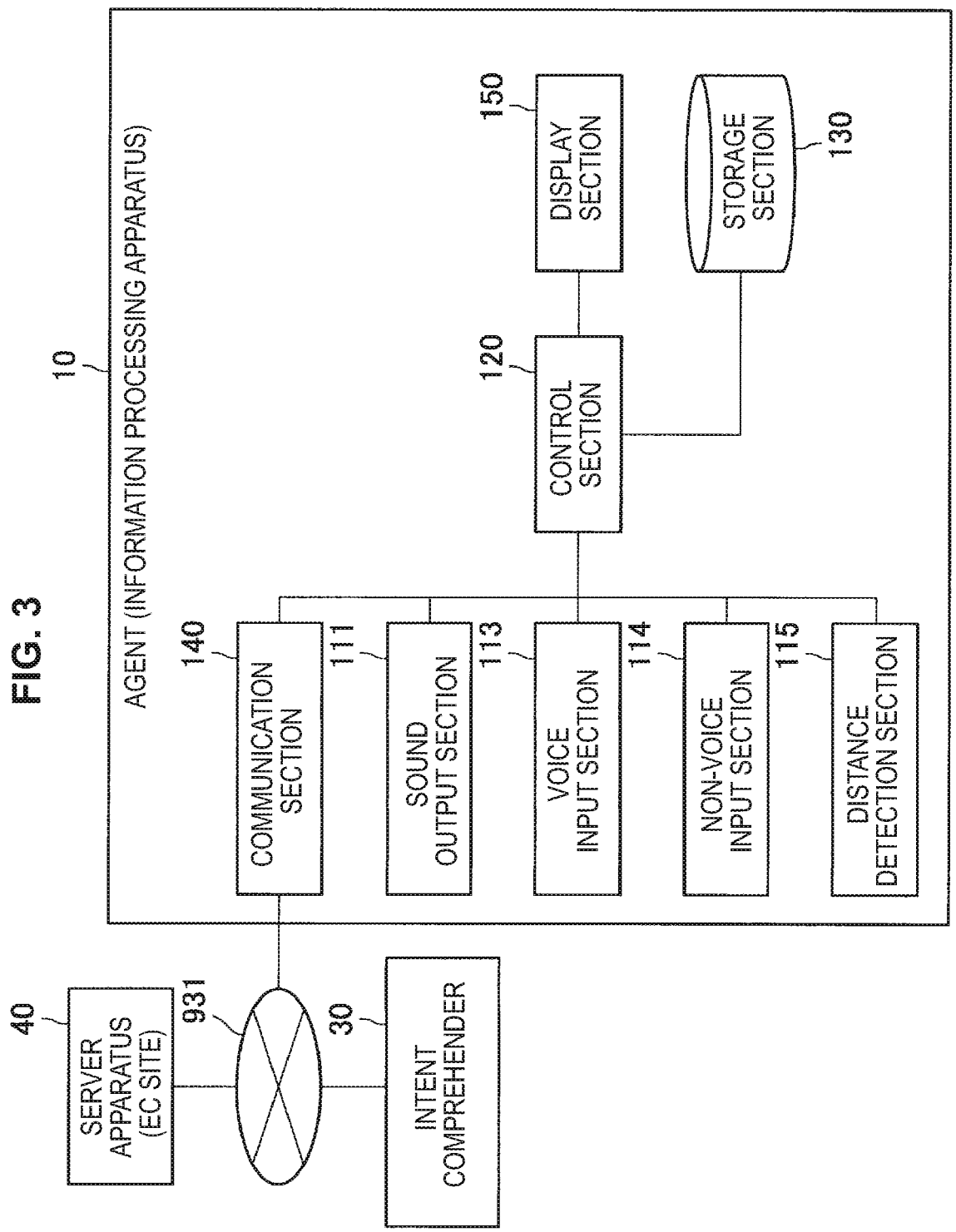
FIG. 3 is a diagram illustrating a functional configuration example of an agent.

Next, a functional configuration example of the agent 10 will be described. FIG. 3 is a diagram illustrating a functional configuration example of the agent 10. As illustrated in FIG. 3, the agent 10 includes a sound output section 111, a voice input section 113, a non-voice input section 114, a distance detection section 115, a control section 120, a storage section 130, a communication section 140, and a display section 150. In addition, the agent 10 is connected to an intent comprehender 30 and a server apparatus 40 via a communication network 931. For example, the communication network 931 includes the Internet.

The sound output section 111 has a function of outputting sound. For example, the sound output section 111 includes a speaker. The sound is output through the speaker. The number of speakers included in the sound output section 111 is not particularly limited as long as the number of speakers is one or more. Then, the installation position of each of the one or more speakers included in the sound output section 111 is not also particularly limited. Note that, the sound output section 111 may include a sound output apparatus (e.g., earphones, headset, or the like) other than the speaker as long as the sound output apparatus has a function of outputting sound.

The voice input section 113 has a function of acquiring sound by picking up the sound. For example, the voice input section 113 includes a microphone, and picks up sound through the microphone. The number of microphones included in the voice input section 113 is not particularly limited as long as the number of microphones is one or more. Then, the installation position of each of the one or more microphones included in the voice input section 113 is not also particularly limited. Note that, the voice input section 113 may include a sound pickup apparatus other than the microphone as long as the sound pickup apparatus has a function of picking up sound information.

The non-voice input section 114 has a function of acquiring information other than voice. The present specification chiefly describes an example in which the non-voice input section 114 includes a touch panel and an imaging apparatus. The touch panel can detect a depression operation by a user. In addition, the imaging apparatus can detect a user's gesture and line of sight from an image obtained by performing imaging. However, the non-voice input section 114 is not limited to such an example. For example, the non-voice input section 114 may include a button that detects a depression operation. In addition, the non-voice input section 114 may include a motion sensor that detects the motion of a user. The motion sensor may detect acceleration with an acceleration sensor, or detect angular velocity with a gyro sensor.

The distance detection section 115 has a function of detecting the distance to a user. For example, the distance detection section 115 includes a ranging sensor, and acquires the distance to a user detected by the ranging sensor. The installation position of the ranging sensor is not particularly limited. In addition, the type of the ranging sensor is not particularly limited. For example, the ranging sensor may be an infrared distance sensor or may be an ultrasonic distance sensor.

The communication section 140 has a function of communicating, via the communication network 931, with the server apparatus 40 and the intent comprehender 30 connected to the communication network 931. For example, the communication section 140 includes a communication interface. Note that, the number of the server apparatuses 40 connected to the communication network 931 may be one or more. The present specification chiefly describes an example in which the server apparatus 40 provides the agent 10 with an EC site.

The storage section 130 is a recording medium configured to store a program to be executed by the control section 120 and store data necessary for executing the program. In addition, the storage section 130 temporarily stores data for an operation by the control section 120. The storage section 130 includes a magnetic storage section device, a semiconductor storage device, an optical storage device, a magneto-optical storage device, or the like.

The display section 150 has a function of displaying various screens. In the present embodiment, the case is chiefly assumed where the display section 150 is a projector. However, the type of the display section 150 is not limited. For example, the display section 150 may be a liquid crystal display or an organic electro-luminescence (EL) display as long as the display section 150 is a display (display apparatus) capable of displaying a screen that is visible to a user. In addition, the present specification chiefly assumes the case where the display section 150 performs display at a relatively high position (e.g., wall or the like) or performs display at a relatively low position (e.g., abdomen of the agent or a place near a hand of a user). However, the position at which the display section 150 performs display is not also limited.

Figure 4:
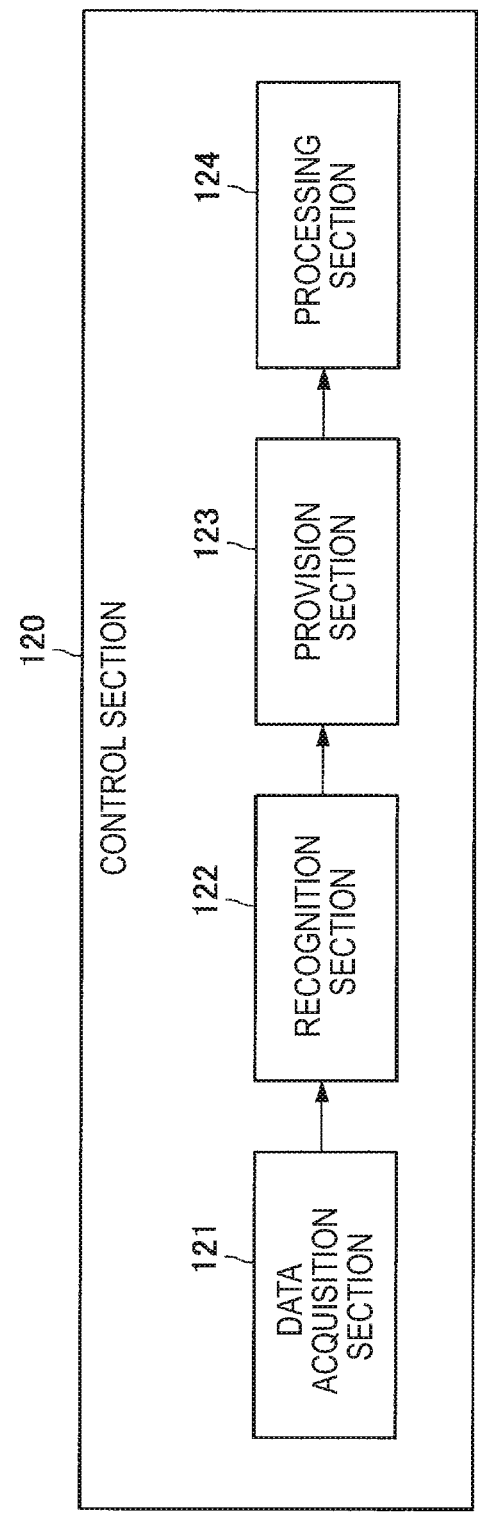
FIG. 4 is a diagram illustrating a detailed configuration example of a control section.

The control section 120 controls each section of the agent 10. FIG. 4 is a diagram illustrating a detailed configuration example of the control section 120. As illustrated in FIG. 4, the control section 120 includes a data acquisition section 121, a recognition section 122, a provision section 123, and a processing section 124. Details of each of these functional blocks will be described below. Note that, for example, the control section 120 may include a central processing unit (CPU) or the like. In the case where the control section 120 includes a processing apparatus such as a CPU, the processing apparatus may include an electronic circuit.

Note that, hereinafter, the wording "voice" (or "speech") and the wording "sound" are used differently. That is, among sound picked up by the voice input section 113, voice or speech chiefly refers to user speech. Meanwhile, sound can also include noise and the like in addition to user speech.

The above describes a functional configuration example of the agent 10 according to the present embodiment.

[1.3. Detailed Functions]
(1.3.1. Screen Configuration Example)

Figure 5:
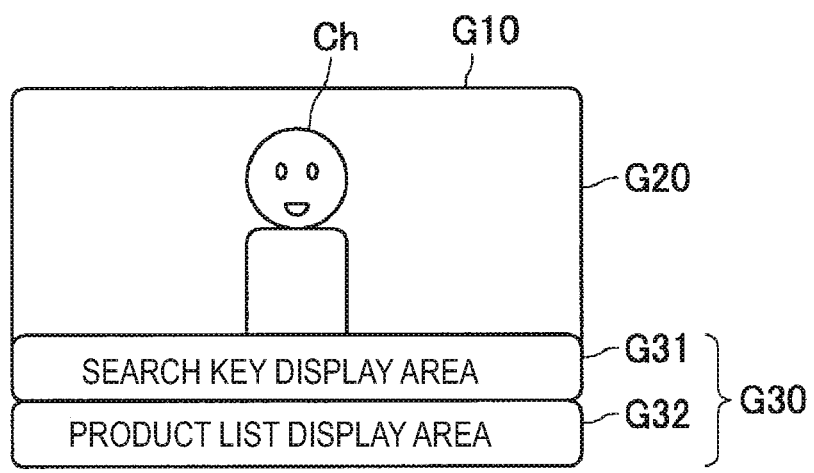
FIG. 5 is a diagram illustrating an example of a screen displayed by a display section of a PC agent.

Next, a detailed function of the agent 10 will be described. First, an example of a screen displayed by the display section 150 of the PC agent 10-1 will be described. FIG. 5 is a diagram illustrating an example of a screen displayed by the display section 150 of the PC agent 10-1. As illustrated in FIG. 5, the display section 150 displays a screen G10. The screen G10 includes an EC screen G30 in addition to a character image display area G20.

The character image display area G20 includes a character image Ch and a background image thereof. The character image Ch is favorably such an image of a character that evokes a dialogue from a user or captures a user' affections. Displaying the character image Ch facilitates a user to have a dialogue with the agent 10-1. Note that the character image display area G20 may be absent in particular. Alternatively, the character image Ch may be omitted, and a background image alone may be displayed.

The EC screen G30 includes a search key display area G31 that displays a search word (which will also be referred to as "search key" below.), and a product list display area G32 that displays a product list. The search key display area G31 displays a search key (e.g., main word and filter word) acquired from user speech by performing a voice recognition process. For example, a main word (which will also be referred to as "main key" below.) may be a product name, and a filter word (which will also be referred to as "filter key" below.) may be the weight, type, brand and the like of a product. The product list display area G32 displays a list (product list) of information regarding products acquired by conducting a search using a search key.

For example, when a user says "I want to buy rice," the data acquisition section 121 of the agent 10-1 acquires the user speech "I want to buy rice" via the voice input section 113, and the recognition section 122 extracts the product name "rice" from the user speech "I want to buy rice" and acquires information regarding one or more products whose product name is "rice" as search results associated with the product name "rice." Then, the provision section 123 displays the search results associated with "rice" in the product list display area G32. Note that, as a product name, not only a general name such as "rice," but a proper product name may also be recognized. For example, as a proper product name, a product name protected as a trademark may be recognized.

Next, when a user says "I want to buy detergent," the processing section 124 similarly acquires information regarding one or more products whose product name is "detergent" as search results associated with the product name "detergent." Then, the provision section 123 switches the display of the product list display area G32 from the search results associated with "rice" to the search results associated with "detergent."

(1.3.2. Dialogue Example When Filtering Products)

Basically, a search is first conducted with a product name as a main key. However, simply using a product name as a search key does not lead to successful filtering to a target product in some cases. In such a case, a user has to additionally input a filter word (search key for filtering products). For example, a user has to add filter keys such as a type, quantity, a place of origin, and a brand to the main key "rice."

For example, in the case where a user first says "I want rice," the product name "rice" is extracted from the user speech "I want rice" and the product name "rice" is input as a main key for selecting a product. Then, the server apparatus 40 (EC site) conducts a product search using the main key "rice" as a search key.

Next, in the case where the user says "Add 5 Kg," the quantity "5 Kg" of the product is extracted from the user speech "Add 5 Kg" and the quantity "5 Kg" is input as a filter key. Then, the server apparatus 40 (EC site) conducts a product search using the search keys "rice+5 Kg" obtained by combining the main key "rice" with the filter key "5 Kg" as an and condition.

Next, in the case where the user says "Add AAA (brand)," the brand "AAA" of the product is extracted from the user speech "Add AAA (brand)" and the brand "AAA" is input as a filter key. Then, the server apparatus 40 (EC site) conducts a product search using the search keys "rice+5 Kg+AAA" obtained by combining the main key "rice," the filter key "5 Kg," and the filter key "AAA" as an and condition.

Next, when the user says "OK" and the recognition section 122 recognizes "OK," the server apparatus 40 (EC site) performs a purchase process (process of placing the product found by conducting a search in a cart or payment process for the product found by conducting a search) for the product by conducting a search. Next, in the case where the user says "I want mayonnaise," the server apparatus 40 (EC site) similarly conducts a product search using the main key "mayonnaise" as a search key.

(1.3.3. Screen Configuration Example When Filtering Products)

Figure 6:
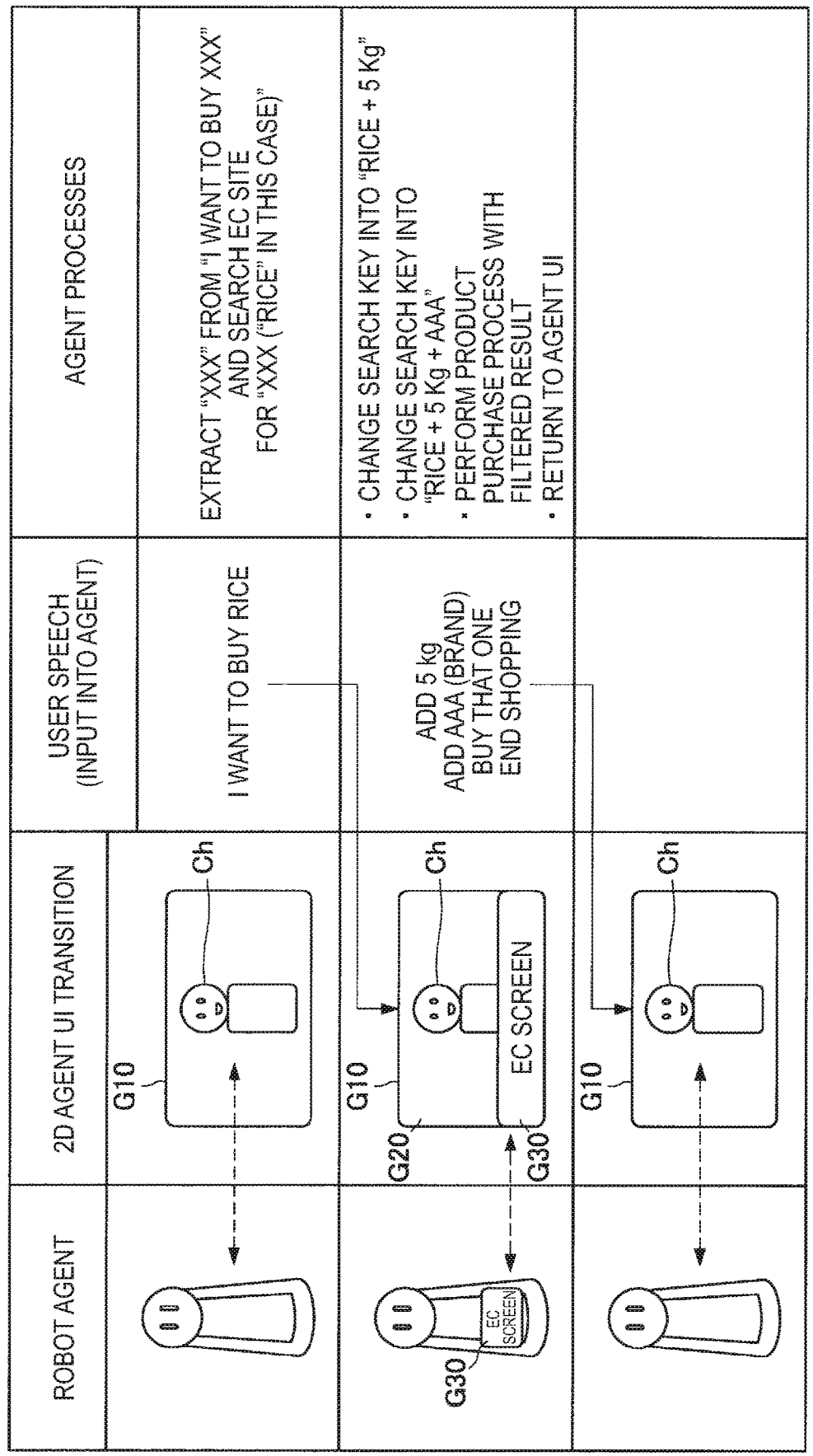
FIG. 6 is a diagram for describing a screen configuration example in which products are filtered.

Next, a screen configuration example when filtering products will be described. FIG. 6 is a diagram for describing a screen configuration example in which products are filtered. FIG. 6 illustrates each stage of user speech, and the "robotic agent," "2D agent UI transition," and "agent processes" corresponding to each stage of the user speech.

The "robotic agent" shows an appearance example of the robotic agent 10-2 in the case where the agent 10 is the robotic agent 10-2. The "2D agent UI transition" shows an example of the screen G10 displayed by the PC agent 10-1 in the case where the agent 10 is the PC agent 10-1. The "agent processes" show examples of processes executed by the agent 10.

For example, in the case where, as shown in the "user speech," a user says "I want to buy rice," the data acquisition section 121, as shown in the "agent processes," acquires the user speech "I want to buy rice" via the voice input section 113 and the recognition section 122 extracts the product name "rice" from the user speech "I want to buy rice." When the server apparatus 40 (EC site) searches for a product list whose product name is "rice," the processing section 124 acquires the product list. Then, the provision section 123 displays the acquired product list in the EC screen G30.

Next, as shown in the "user speech," in the case where the user says "Add 5 Kg," the quantity "5 Kg" of the product is extracted from the user speech "Add 5 Kg" and the quantity "5 Kg" is input as a filter key. Then, as shown in the "agent processes," the server apparatus 40 (EC site) conducts a product search using the search keys "rice+5 Kg" obtained by combining the main key "rice" with the filter key "5 Kg" as an and condition.

Next, as shown in the "user speech," in the case where the user says "Add AAA (brand)," the brand "AAA" of the product is extracted from the user speech "Add AAA (brand)" and the brand "AAA" is input as a filter key. Then, as shown in the "agent processes," the server apparatus 40 (EC site) conducts a product search using the search keys "rice+5 Kg+AAA" obtained by combining the main key "rice," the filter key "5 Kg," and the search key "rice+5 Kg+AAA" as an and condition.

Next, as shown in the "user speech," when the user says "buy that one" and the recognition section 122 recognizes "buy that one," the server apparatus 40 (EC site) performs a purchase process (process of placing the product found by conducting a search in a cart or payment process for the product found by conducting a search) for the product by conducting a search. Next, when, as shown in the "user speech," the user says "end shopping" and the recognition section 122 recognizes "end shopping," displaying the EC screen G30 is ended.

Here, even if the user says "Add AAA (brand)" at the timing at which the EC screen G30 is not displayed, "AAA (brand)" does not have to be added as a filter key (time place occasion (TPO), or the intent interpretation of the user speech may be different in accordance with the context). For example, the same speech may be differently interpreted in accordance with clothes worn by the character image Ch or a background image of the character image Ch.

More specifically, in the case where the character image Ch is displayed wearing an apron (or in the case where a kitchen is displayed in the background of the character image Ch), a process based on an intent interpretation result of the user speech may be executed only when the user speech is interpreted to have food-related intent (i.e., the intent of the user speech may be interpreted on the basis of an attribute of a predetermined element included in the display information).

(1.3.4. Intent Interpretation Corresponding to Situation)

Even if a user says the same thing to the agent 10, the speech is assumed to have different intent in accordance with a situation. For example, even if a user says "Add XXX" to the agent 10, as shown in the following example, the user speech "Add XXX" is assumed to have different intent in accordance with a situation.

For example, in the state in which the EC screen G30 is displayed, and in the state in which the product list display area G32 displays no product list, the user speech "Add XXX" is assumed to be speech intended to add the filter key "XXX" at the time of search. Meanwhile, in the state in which the EC screen G30 is displayed (state in which products are being filtered), and in the state in which the product list display area G32 displays a product list, the user speech "Add XXX" is assumed to be speech intended to add the new product "XXX" to the cart.

Alternatively, in the state in which a screen of an education-related application (the following refers to an "application" simply as "app" in some cases.) is displayed (e.g., in the state in which a screen for working out a problem in mathematics is displayed), the user speech "Add XXX" is assumed to be speech intended to add "XXX" to some number (e.g., number that has already been input). Thus, the intent interpretation of the user speech favorably depends on a situation.

Figure 7:
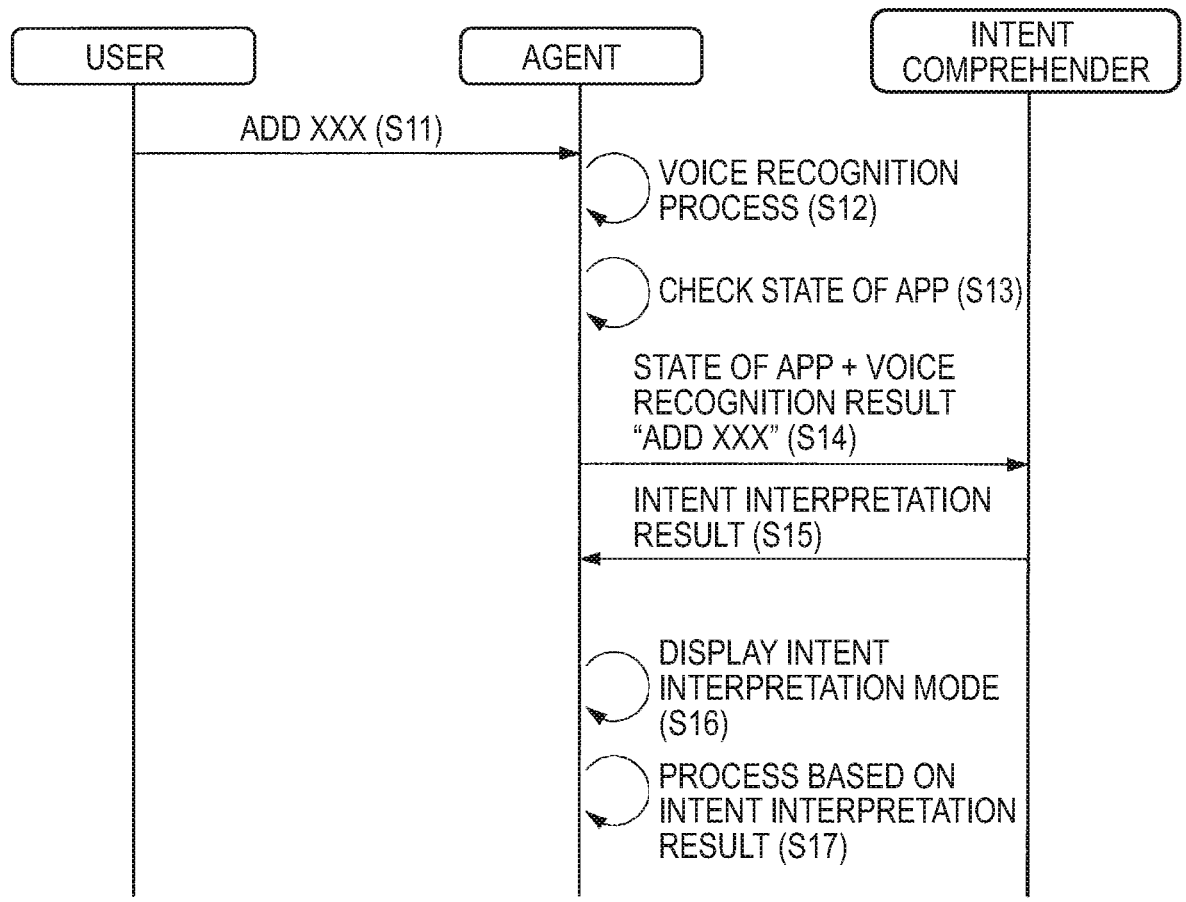
FIG. 7 is a sequence diagram illustrating an operation example of intent interpretation corresponding to a situation.

FIG. 7 is a sequence diagram illustrating an operation example of intent interpretation corresponding to a situation. For example, when the data acquisition section 121 acquires the user speech "Add XXX" via the voice input section 113 (S11) and the recognition section 122 performs a voice recognition process on the user speech (S12), the data acquisition section 121 acquires and checks the state of an application linked to information (display information) displayed by the display section 150 as an example of information (which will also be referred to as "related information" below.) related to the display information (S13).

The following describes the case where the related information is the state of an application linked to the display information. However, the related information is not limited to the state of an application, but it is sufficient that the related information is information related to the display information. The state of an application can include the type of application (e.g., an application of an EC site, an education-related application, and the like). In addition, the state of an application can further include the execution stage (e.g., state of filtering products, state of displaying a product list, and the like) of an application.

The application linked to the display information may be an application that causes the display information to be displayed, but the application linked to the display information is not limited thereto. The application linked to the display information may be an application that has something to do with the display information. The state of the application linked to the display information is provided by the provision section 123 to the intent comprehender 30 along with the voice recognition result "Add XXX" (S14). The intent comprehender 30 interprets the intent of the voice recognition result in accordance with the state of the application. Then, the intent comprehender 30 provides the intent interpretation result to the agent 10 (S15).

In the case of different display information, the intent interpretation result may be different. More specifically, the display information displayed by the display section 150 can include first display information related to first related information. In addition, the display information displayed by the display section 150 can include second display information related to second related information. Then, the intent interpretation result corresponding to the first related information may be different from the intent interpretation result corresponding to the second related information different from the first related information.

The intent comprehender 30 decides the intent interpretation mode of the voice recognition result in accordance with the state of the application, and interprets the intent of the voice recognition result in accordance with the decided intent interpretation mode. Here, when the intent interpretation mode of the voice recognition result is decided in accordance with the state of the application, the intent comprehender 30 provides information indicating the intent interpretation mode to the agent 10 and, in the agent 10, the provision section 123 provides the information indicating the intent interpretation mode to a user.

Here, an example is assumed in which the provision section 123 displays the information indicating the intent interpretation mode as visual information (S16). However, it is sufficient that the information indicating the intent interpretation mode is provided to a user as at least one of visual information or voice information. In addition, the information indicating the intent interpretation mode may include at least any one of a character image, an icon image, a background image, or BGM.

Figure 8:
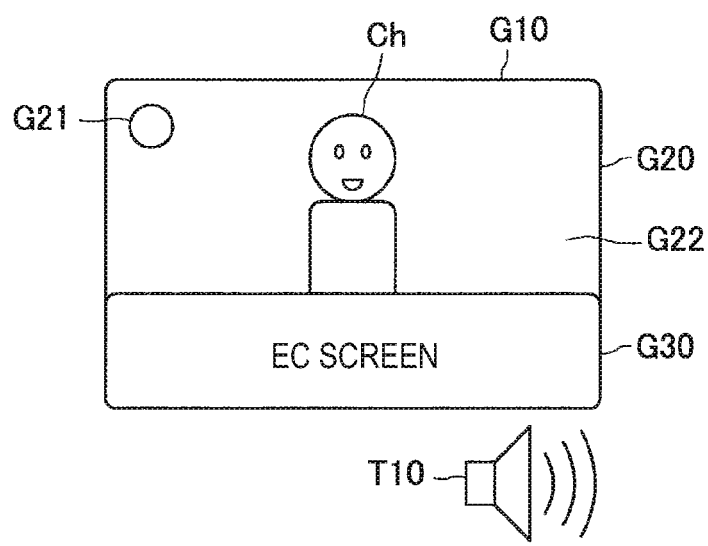
FIG. 8 is a diagram illustrating a display example of information indicating an intent interpretation mode.

FIG. 8 is a diagram illustrating a display example of information indicating an intent interpretation mode. In the example illustrated in FIG. 8, the information indicating the intent interpretation mode includes a character image Ch, an icon image G21, a background image G22, and BGM (T10). However, at least any one of these may be included in the information indicating the intent interpretation mode.

If the character image Ch is displayed like the character image Ch wears the clothes corresponding to the intent interpretation mode, the clothes can represent the information indicating the intent interpretation mode. At this time, if a specific symbol or mark (e.g., corporate logo or the like)

is added to the clothes, the symbol or mark can represent the information indicating the intent interpretation mode. Note that another wearable thing (e.g., hat or the like) may be displayed instead of clothes. Alternatively, the character image Ch may represent the information indicating the intent interpretation mode by using the character itself.

The icon image G21 can represent the information indicating the intent interpretation mode by using its shape or color. For example, when the state of the application is the state of filtering products, the icon image G21 may be a cart. Alternatively, when the state of the application is the state of displaying a screen of an education-related application, the icon image G21 may be a calculator icon.

Besides, the background image G22 can represent the information indicating the intent interpretation mode by using a thing drawn in the background or a background color. In addition, if the sound (e.g., musical composition or the like) corresponding to the intent interpretation mode is output, the BGM (T10) can represent the information indicating the intent interpretation mode by using the sound.

The description will continue with reference to FIG. 7 again. The processing section 124 performs a process based on the intent interpretation result (S17), and the provision section 123 provides a process result based on the intent interpretation result to a user. If the process result based on the intent interpretation result is provided to a user, a process result that takes the intent of user speech into consideration is provided to the user. Thus, it is possible to enhance the possibility that a process result desired by a user is provided to the user. For example, it is sufficient that the process result is provided to a user as at least any one of visual information or voice information.

Here, the type of process based on the intent interpretation result is not limited in particular. For example, in the case where the state of the application is the state of filtering products, the process based on the intent interpretation result may be a process of adding "XXX" as a search key. Alternatively, in the case where the state of the application is the state of displaying a screen of an education-related application, the process based on the intent interpretation result may be a process of adding "XXX" to some number (e.g., number that has already been input).

Figure 9:
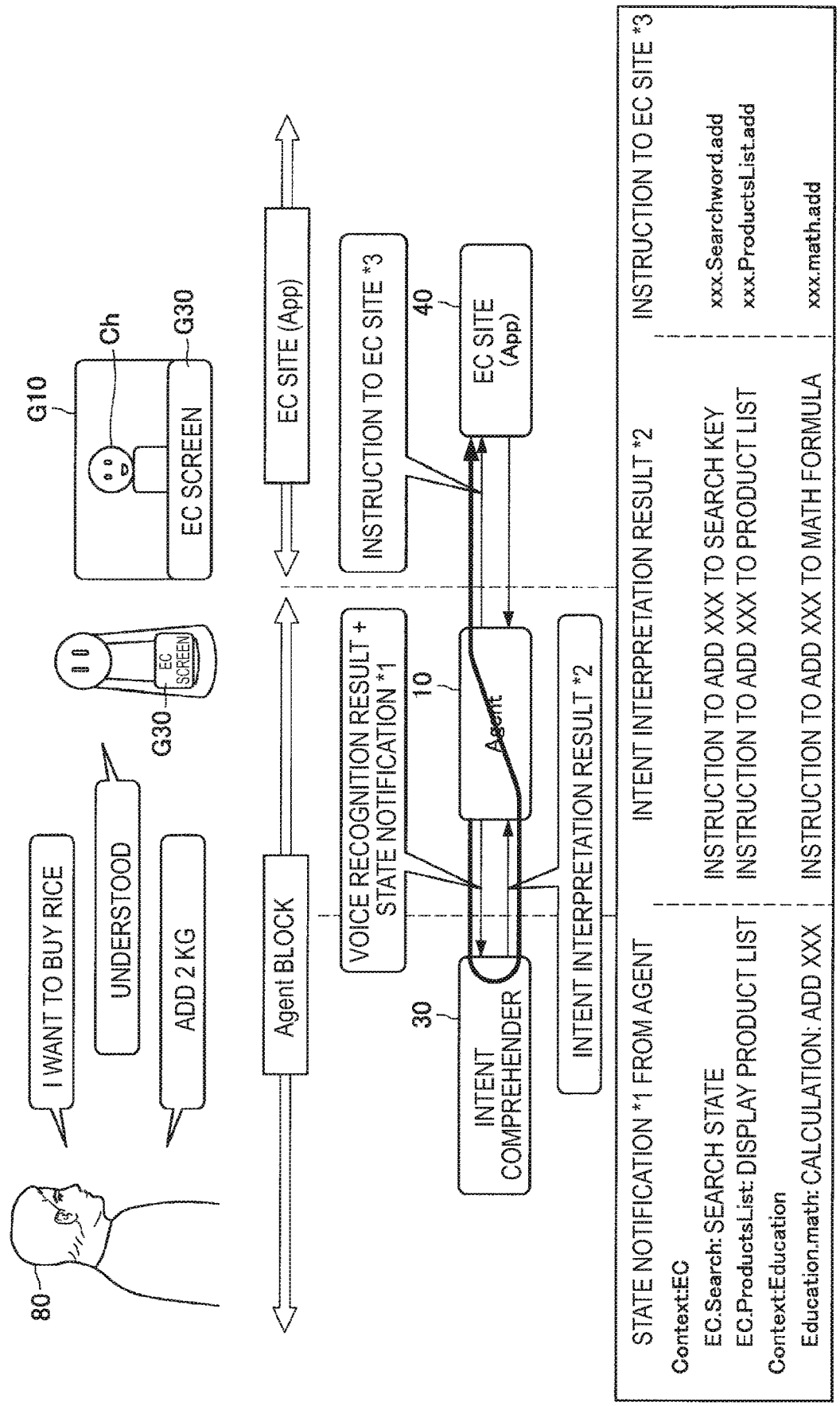
FIG. 9 is a diagram illustrating a configuration example of a system in a case where intent is interpreted in accordance with a situation.

FIG. 9 is a diagram illustrating a configuration example of a system in the case where intent is interpreted in accordance with a situation. As illustrated in FIG. 9, when a user says "Add XXX (here, 2 kg)," in the agent 10, the data acquisition section 121 acquires the user speech "Add XXX" via the voice input section 113 and the recognition section 122 recognizes "Add XXX" as a voice recognition result. The intent comprehender 30 is notified of the voice recognition result "Add XXX" and the application state.

Examples of the application state include a "search state," a "product list display state," a "calculation state of adding XXX," and the like as shown in a "state notification (*1) from agent." The intent comprehender 30 interprets the intent of the voice recognition result "Add XXX" in accordance with the application state.

For example, in the case where the application state is a "search state," the intent comprehender 30 interprets the intent of the voice recognition result "Add XXX" as an "instruction to add XXX to search key" in accordance with the application state "search state" as shown in an "intent interpretation result (*2)." At this time, the intent interpretation result "instruction to add XXX to search key" is provided from the intent comprehender 30 to the agent 10. The agent 10 instructs the server apparatus (EC site) 40 to perform a process of adding XXX to a search key as the process corresponding to the intent interpretation result "instruction to add XXX to search key."

In addition, in the case where the application state is a "product list display state," the intent comprehender 30 interprets the intent of the voice recognition result "Add XXX" as an "instruction to add XXX to product list" in accordance with the application state "product list display state." The agent 10 instructs the server apparatus (EC site) 40 to perform a process of adding XXX to a product list as the process corresponding to the intent interpretation result "instruction to add XXX to product list."

In addition, in the case where the application state is the "calculation state of adding XXX," the intent comprehender 30 interprets the intent of the voice recognition result "Add XXX" as an "instruction to XXX to math formula" in accordance with the application state "calculation state of adding XXX." The agent 10 instructs the server apparatus (EC site) 40 to perform a process of adding XXX to a math formula as the process corresponding to the intent interpretation result "instruction to add XXX to math formula."

(1.3.5. Dialogue According to Whether or not Display Information is Watched)

In the case where the display information is watched by a user, it is the situation in which the user can watch a process result. Accordingly, the process result can be visually recognized by the user. In contrast, in the case where the display information is not watched by a user, it is the situation in which the user is unable to watch a process result. Accordingly, the process result cannot be visually recognized by the user. For example, the process result can be in the state (context; a search key input by the user can be included) in which the process result is recognized by the agent 10.

Thus, the provision section 123 favorably provides a user with voice information different between the case where the user is watching the display information and the case where the user is not watching the display information. If so, the voice information corresponding to the situation of the user is provided to the user. It can be determined whether or not the user is watching the display information, on the basis of whether or not the user's line of sight is present within the display range of the display information. Note that the user's line of sight can be estimated, for example, on the basis of a Purkinje image on the surface of an eyeball of the user which is acquired from the user's image obtained by performing imaging.

Note that it can be estimated on the basis of various kinds of information other than information related to a user's line of sight whether or not the user is watching display information. For example, on the basis of the orientation of a user which is determined on the basis of an image of the user obtained by performing imaging, it may be estimated whether or not the user is watching display information. Here, the orientation of a user may be regarded as the orientation of the face of the user, or the orientation of the whole body of the user. The orientation of the user can be estimated from the feature amount of the face or whole body of the user included in an image. Alternatively, in the case where a user is wearing a wearable device, it may be estimated on the basis of sensor information indicating the orientation of the wearable device whether or not the user is watching display information. Examples of the wearable device include a head-mounted display. The wearable device is not limited to a head-mounted display, but a variety of forms such as a wristband wearable device and a neckband wearable device may be adopted. In addition, as the sensor information, acceleration information, angular acceleration information, captured image information, and the like can be adopted.

For example, as more voice information is provided from the agent 10, it takes more time for a user to listen to the voice information. Therefore, it takes more time for the user to arrive at a target product. Thus, in a situation in which a user can watch a process result, it is desirable to provide the process result to the user as visual information. In contrast, in a situation in which a user is unable to watch a process result, it is desirable to provide part or the entirety of the process result to the user as voice information.

Thus, the provision section 123 favorably provides a user with more detailed voice information in the case where the user is not watching the display information than in the case where the user is watching the display information. More specifically, in the case where a user is watching display information, the provision section 123 may provide a process result to the user at least as visual information. In the case where a user is not watching display information, the provision section 123 may provide the user with the voice information (voice information equivalent to visual information) corresponding to visual information as detailed voice information.

A specific example will be described. The case will be assumed where, after a user says "I want to buy rice" and the agent 10 displays the EC screen G30, the user says "Add XXX." In such a case, in the case where the user is watching display information, the provision section 123 provides the voice information "Yes," displays a search key on the EC screen G30, and displays a search result using the search key and the number of search results.

In contrast, in the case where a user is not watching display information, the provision section 123 provides the process content "I'll add XXX to the search key as a filter key" as voice information. This can also make it possible to confirm whether or not an input made by the user is correct. In addition, the agent 10 adds a filter key to the EC screen G30, provides the number of search results using the main key and the filter key as the voice information "There are N filtered results," and provides the voice information "Do you want to further add a filter key?" encouraging the user to perform the next operation.

Figure 10:
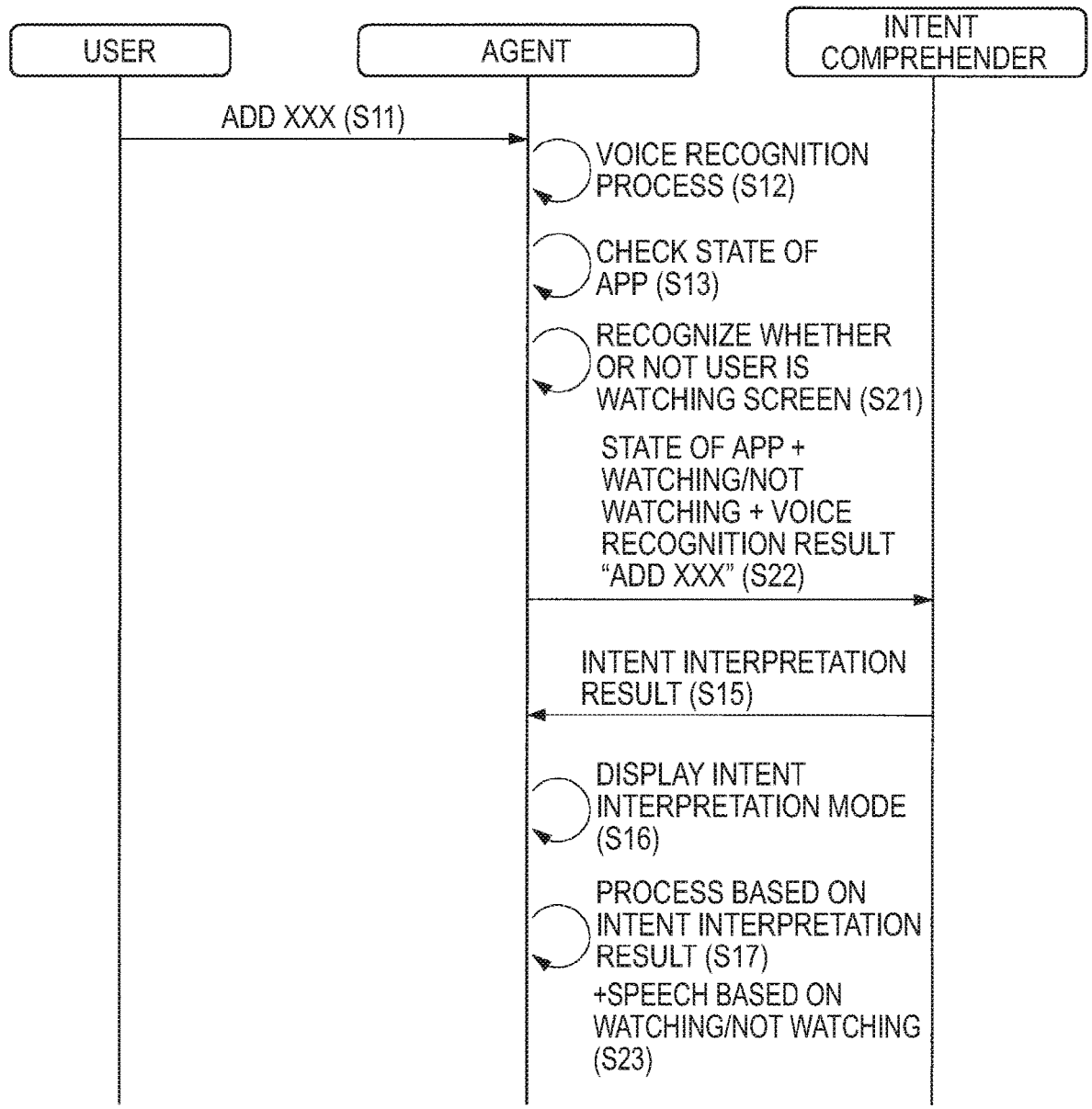
FIG. 10 is a sequence diagram illustrating an operation example of a dialogue according to whether or not a user is watching display information.

FIG. 10 is a sequence diagram illustrating an operation example of a dialogue according to whether or not a user is watching display information. The example illustrated in FIG. 10 is different from the example illustrated in FIG. 7 in that the provision section 123 recognizes whether or not a user is watching a screen (i.e., display information) (S21), and additionally notifies the intent comprehender 30 whether or not a user is watching a screen (S22). In this example, the intent comprehender 30 interprets the intent of a voice recognition result further in accordance with whether or not a user is watching a screen.

In addition, the example illustrated in FIG. 10 is different from the example illustrated in FIG. 7 in that the provision section 123 provides the speech (provides the voice information) that further corresponds to whether a user is watching a screen (S23). For example, in the case where a user is watching display information, the provision section 123 provides the voice information "Yes." In contrast, in the case where a user is not watching display information, the provision section 123 provides the number of search results as the voice information "There are N filtered results."

(1.3.6. Display Example of EC Screen)

Figure 11:
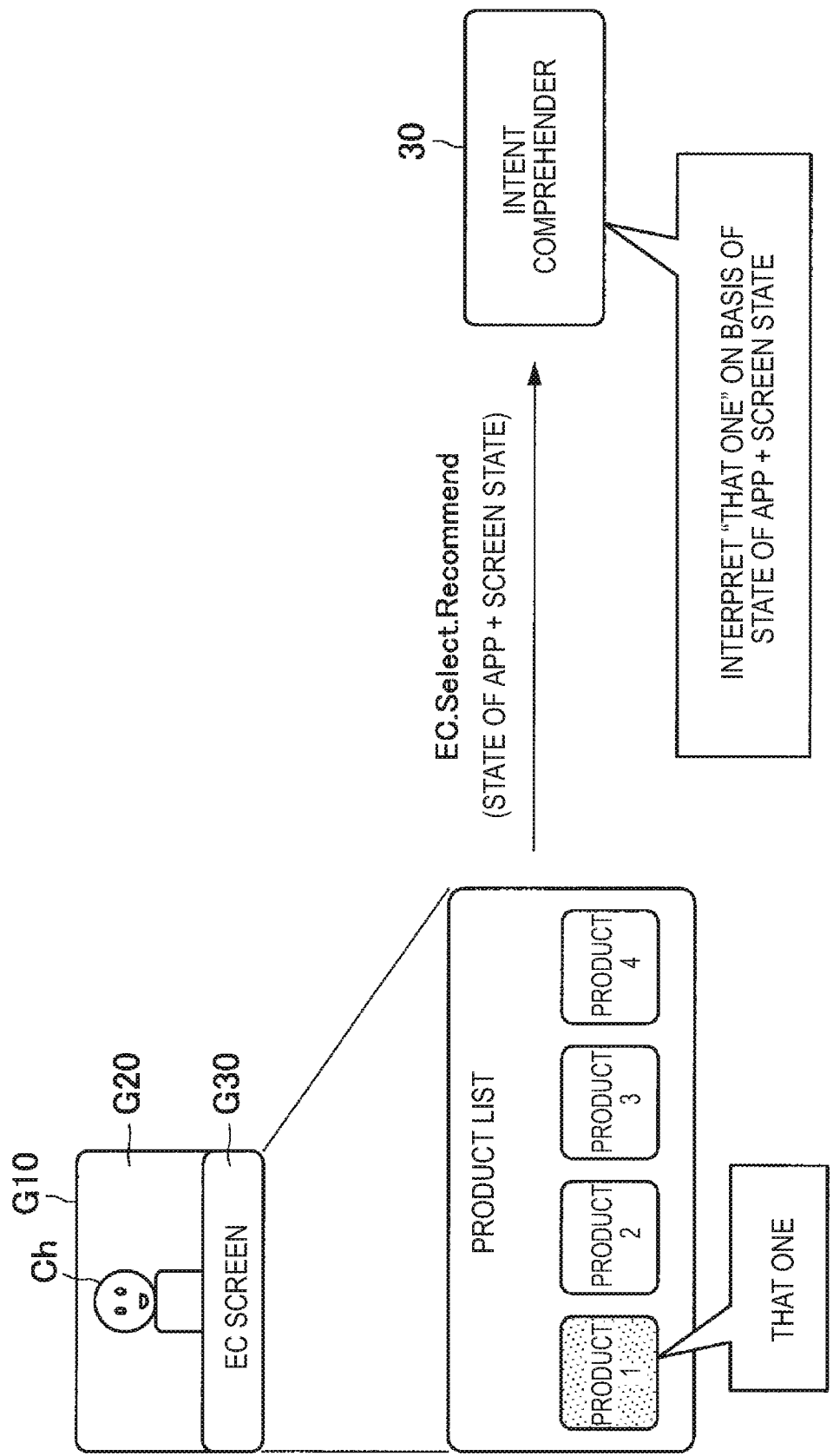
FIG. 11 is a diagram illustrating a display example of an EC screen.

A display example of the EC screen G30 will be described. FIG. 11 is a diagram illustrating a display example of the EC screen G30. As illustrated in FIG. 11, the screen G10 displayed by the display section 150 can include the EC screen G30. When an EC site conducts a search, the EC screen G30 displays a product list acquired by conducting a search. In the example illustrated in FIG. 11, as a product list, products 1 to 4 are displayed.

Here, when a user speaks to indicate a decision (the speech "That one" in the example illustrated in FIG. 11) and the agent 10 recognizes the speech indicating a decision, the intent comprehender 30 identifies a product in focus on the basis of the state of an app and a screen state. Afterward, a purchase process for the identified product is performed. The agent 10 notifies the intent comprehender 30 of the state of an app and a screen state in accordance with an instruction such as EC.Select.Recommend.

In the example illustrated in FIG. 11, a product (product 1) that is the most likely to be purchased in the product list comes into focus. However, the product that comes into focus may be changed as appropriate according to an operation of a user. Alternatively, a product does not have to come into focus. The speech (e.g., third from the right) for selecting a product may select a purchase product. At this time, the selected product may be emphasized.

(1.3.7. Filtering Assistance Technology)

The above shows an example in which a user is caused to input a filter key. According to such an example, a user can arrive at a target product by using an input filter key. However, it can be realistically difficult in some cases to determine what filter key a user should input for a product. That is, it can be difficult in some cases for a user to think of a filter key by himself or herself, and arrive at a product within the shortest distance.

Then, to assist a user in inputting a filter key, a mechanism (such as displaying a candidate word) such as a suggestion as used by a search site or an EC site is favorably activated. First, a suggestion used by a general EC site will be described.

Figure 12:
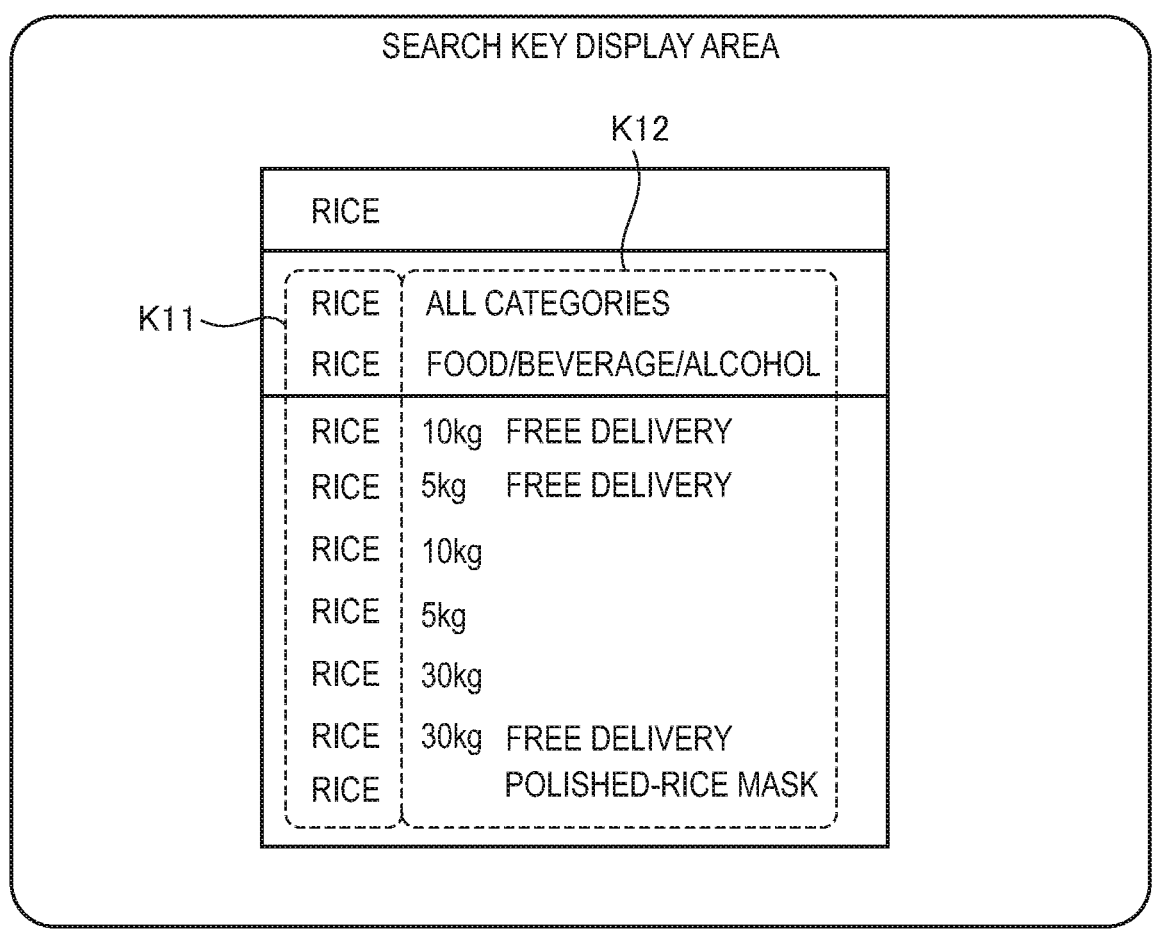
FIG. 12 is a diagram illustrating an example of a search key display area displayed on a general EC site.

FIG. 12 is a diagram illustrating an example of a search key display area displayed on a general EC site. FIG. 12 illustrates that a search key K11 input by a user is displayed. In addition, FIG. 12 illustrates that a word related to the search key K11 is displayed as a candidate word K12. The displayed candidate word K12 assists a user in filtering products. Note that the candidate word K12 is created on the basis of a user's search history or purchase history of products.

Figure 13:
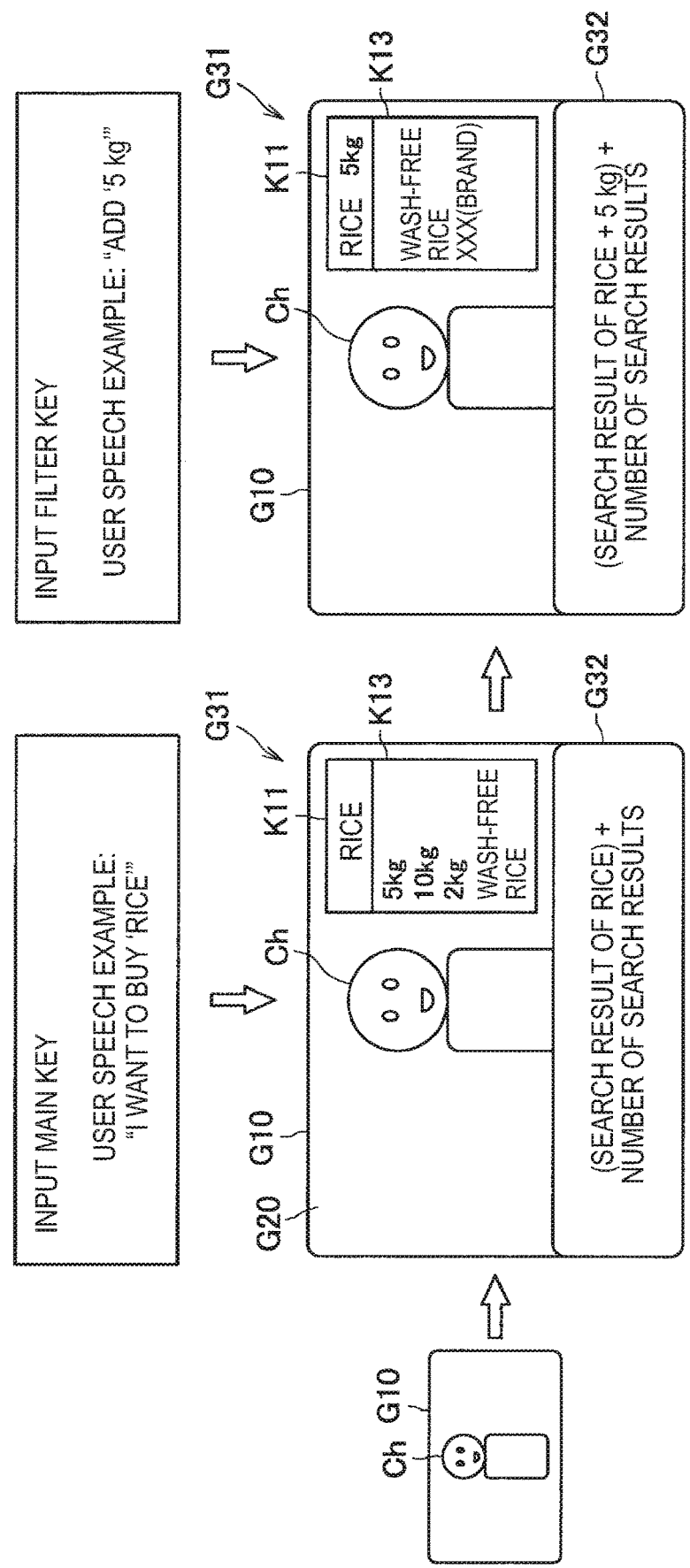
FIG. 13 is a diagram for describing filtering assistance according to an embodiment of the present disclosure.

FIG. 13 is a diagram for describing filtering assistance according to an embodiment of the present disclosure. As illustrated in FIG. 13, when a user says "I want to buy rice" in inputting a main key, a voice recognition process is performed on the user speech and the first voice recognition result "I want to buy rice" and the state of an application are provided to the intent comprehender 30. The intent comprehender 30 interprets the intent of the first voice recognition result in accordance with the state of the application. Then, the intent comprehender 30 provides the intent interpretation result to the agent 10.

In the agent 10, the data acquisition section 121 extracts the first input word "rice" from the intent interpretation result, and acquires a candidate list including the one or more candidate words corresponding to the first input word "rice." As illustrated in FIG. 13, the provision section 123 causes the search key display area G31 to display the search key K11 "rice," and causes the search key display area G31 to display the candidate list K13 "5 Kg, 10 kg, 2 kg, wash-free rice." In addition, the provision section 123 provides a process result based on the intent interpretation result to the user. Specifically, the provision section 123 causes the product list display area G32 to display a search result of the search key "rice" and the number of search results.

The candidate list K13 assists a user in selecting a filter key. Next, when the user selects "5 Kg" from the candidate list K13 "5 Kg, 10 kg, 2 kg, wash-free rice" as a filter key and says "Add 5 Kg," a voice recognition process is performed on the user speech and the second voice recognition result "Add 5 kg" and the state of the application are provided to the intent comprehender 30. The intent comprehender 30 interprets the intent of the second voice recognition result in accordance with the state of the application. Then, the intent comprehender 30 provides the intent interpretation result to the agent 10.

In the agent 10, the data acquisition section 121 extracts the second input word "5 Kg" from the intent interpretation result, and acquires a candidate list including the one or more candidate words corresponding to the second input word "5 Kg." As illustrated in FIG. 13, the provision section 123 causes the search key display area G31 to display the search keys K11 "rice, 5 Kg," and causes the search key display area G31 to display the candidate list K13 "wash-free rice, XXX (brand)." In addition, the provision section 123 provides a process result based on the intent interpretation result to the user. Specifically, the provision section 123 causes the product list display area G32 to display a search result of the search keys "rice+5 kg" and the number of search results.

Figure 14:
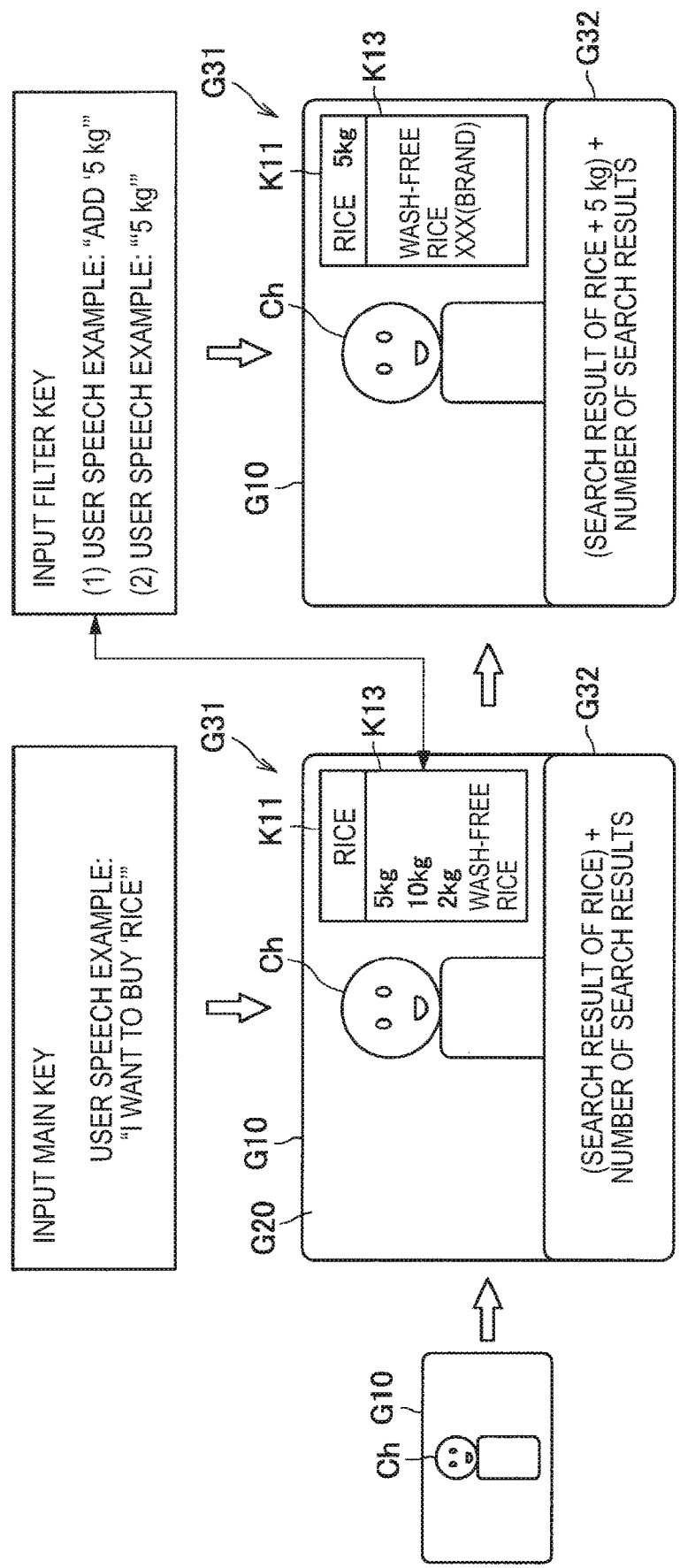
FIG. 14 is a diagram for describing a contrivance to make user speech simpler and more noise-resistant.

Here, a contrivance to make user speech simpler and more noise-resistant may be used. FIG. 14 is a diagram for describing a contrivance to make user speech simpler and more noise-resistant. For example, the case will be assumed where "I want to buy rice" is said to input a main key, and "5 Kg" is said to input a filter key. That is, the case will be assumed where the speech includes no instruction word ("Add" in the example illustrated in FIG. 14). At this time, the agent 10 acquires the second voice recognition result "5 kg" and the second input word "5 kg." Note that, in the present specification, the "instruction word" may be regarded as speech to instruct the information processing apparatus 10 what process to do for an "input word." For example, a verb such as "want to buy," or "Add" may be regarded as an "instruction word."

FIG. 14 illustrates that the second input word "5 kg" is included in the candidate list K13. In such a case, even if the second voice recognition result "5 kg" includes no instruction word, the provision section 123 favorably provides the user with a process result based on the intent interpretation result corresponding to the second input word "5 Kg." Specifically, the provision section 123 favorably adds the second input word "5 Kg" to the main key "rice" as a filter key, and provides the user with a search result using the search keys "rice, 5 kg." This is expected to make user speech simpler and more noise-resistant.

Note that all in the candidate list K13 do not have to be displayed. That is, FIG. 14 illustrates an example in which the candidate word "5 Kg" is displayed, but the candidate word "5 Kg" does not have to be displayed. In addition, to make a user determine whether or not it is necessary to further filter products, the provision section 123 may provide the user with the number of search results prior to the product list.

In addition, whenever the filter key "5 kg" is added according to user speech to generate the new search keys "rice, 5 Kg," the provision section 123 may provide the user with a search result using the new search keys "rice, 5 Kg."

Alternatively, in the case where a user says no filter key within a predetermined time, the provision section 123 may provide the user with a search result using the new search keys "rice, 5 kg," to which the candidate word "5 kg" in the candidate list K13 is added as a filter key.

The example described above assumes the case where a second input word is included in the candidate list K13, but the case where no second input word is included in the candidate list K13 can be also possible. In such a case, even if the second voice recognition result includes an instruction word, the provision section 123 favorably provides the user with a process result based on the intent interpretation result corresponding to the second input word.

For example, the case will be assumed where a user says "Add 20 kg" in inputting a filter key. In such a case, the second input word "20 kg" is not included in the candidate list K13, but the second voice recognition result "Add 20 kg" includes an instruction word. Therefore, the provision section 123 favorably provides the user with a process result based on the intent interpretation result corresponding to the second input word "20 kg." Specifically, the provision section 123 favorably causes the product list display area G32 to display a search result of the search keys "rice+20 kg" and the number of search results.

In contrast, the case where the second input word is not included in the candidate list K13, and the case where the second voice recognition result includes no instruction word are also assumed. In such cases, the provision section 123 favorably ignores the second input word.

For example, the case will be assumed where a user says "20 kg" in inputting a filter key. In such a case, the second input word "20 kg" is not included in the candidate list K13, or the second voice recognition result "20 kg" includes no instruction word. In such cases, the provision section 123 favorably ignores the second input word "20 kg." Specifically, a search using the search keys "rice+20 kg" does not have to be conducted.

Here, each of one or more candidate words included in a candidate list has an attribute. For example, the candidate word "2 kg" has the attribute "weight," and the candidate word "XXX" has the attribute "brand." In the example described above, an attribute of each of one or more candidate words included in a candidate list is not taken into consideration in particular. However, by taking each attribute into consideration, a candidate list may be provided to a user. If so, the user can select a candidate word by taking an attribute into consideration.

Here, each of one or more candidate words included in a candidate list may be associated with attribute information in advance. Then, as a provision example of a candidate list that takes an attribute into consideration, the provision section 123 may provide at least part of the candidate list to a user for each piece of corresponding attribute information. As an example, the following describes an example in which all in the created candidate list are provided to a user for each piece of attribute information.

Figure 15:
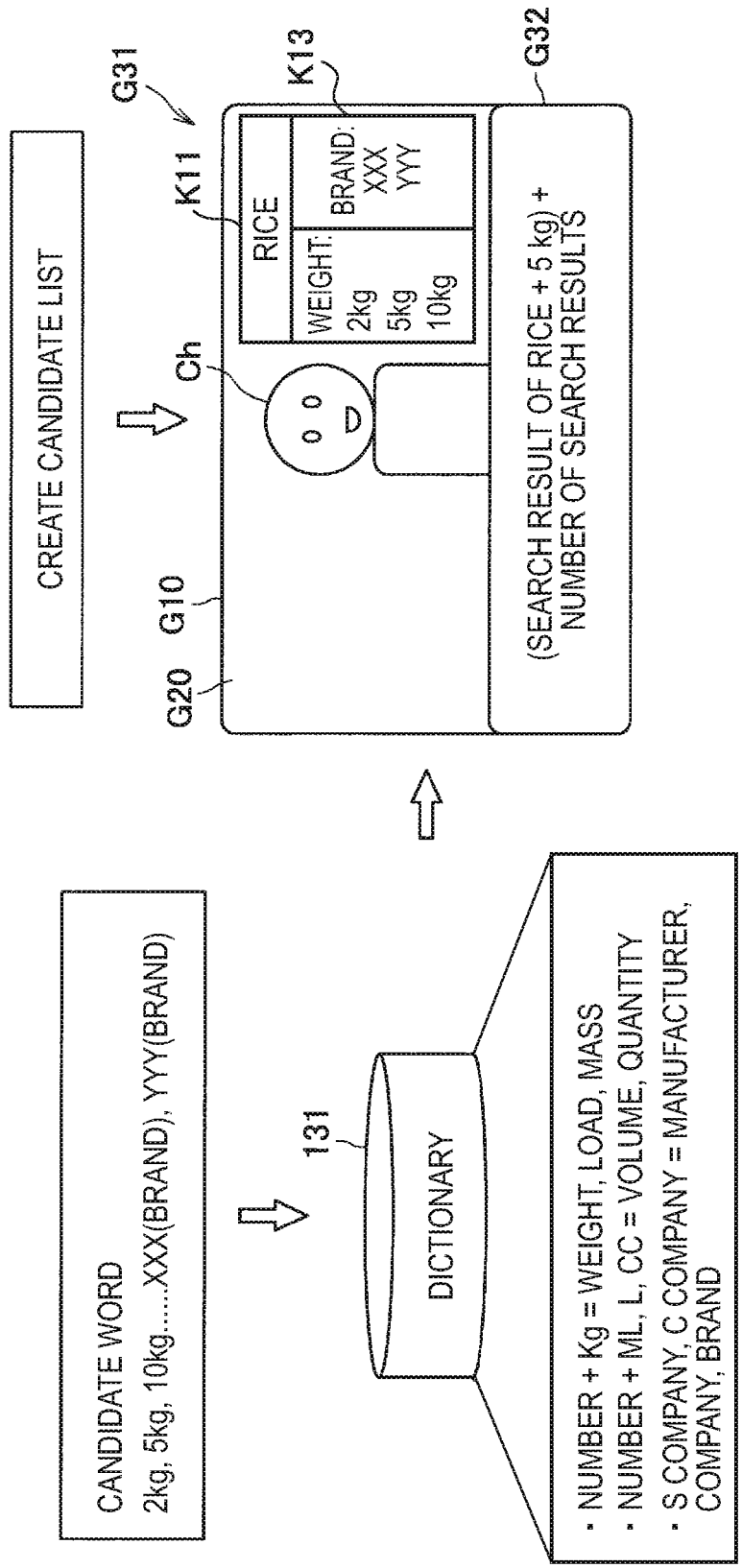
FIG. 15 is a diagram for describing an example in which a candidate list is provided to a user for each piece of attribute information.

FIG. 15 is a diagram for describing an example in which a candidate list is provided to a user for each piece of attribute information. FIG. 15 illustrates that the candidate words "number+kg" are associated with the attribute information "weight, load, mass," and then registered in a dictionary 131. In addition, among these candidate words, the candidate words "number+ML, L, CC" are associated with the attribute information "volume, quantity," and then registered in the dictionary 131. In addition, among these candidate words, the candidate words "S company, C company" are associated with the attribute information "manufacturer, company, brand," and then registered in the dictionary 131.

In addition, FIG. 15 illustrates that "2 kg, 5 Kg, 10 kg, ..., XXX (brand), YYY (brand)" and the like are prepared as examples of a plurality of candidate words. A plurality of such candidate words are categorized for each piece of attribute information on the basis of the association of the candidate words registered in the dictionary 131 with attribute information.

Next, as illustrated in FIG. 15, when a user says "I want to buy rice" in inputting a main key, as described above, in the agent 10, the data acquisition section 121 acquires a candidate list including one or more candidate words corresponding to the first input word "rice." The provision section 123 causes the search key K11 "rice" to be displayed in the search key display area G31, and causes the candidate list K13 to be displayed in the search key display area G31 for each piece of attribute information.

The attribute information of the candidate words "2 kg, 5 Kg, 10 kg" is "weight." The attribute information of the candidate words "XXX, YYY" is "brand." Here, a plurality of candidate words may be displayed in any order. For example, a plurality of candidate words may be displayed in the descending order of search frequency, in the ascending order of product quantity, or in the descending order of purchase frequency.

In addition, as an example of the provision of a candidate list that takes an attribute into consideration, in the case where a third voice recognition result acquired prior to a second voice recognition result includes attribute information, the provision section 123 may be provide a user with at least part of the candidate list corresponding to the attribute information. The following describes an example in which all in a candidate list corresponding to attribute information included in a third voice recognition result are provided to a user for each piece of attribute information.

Figure 16:
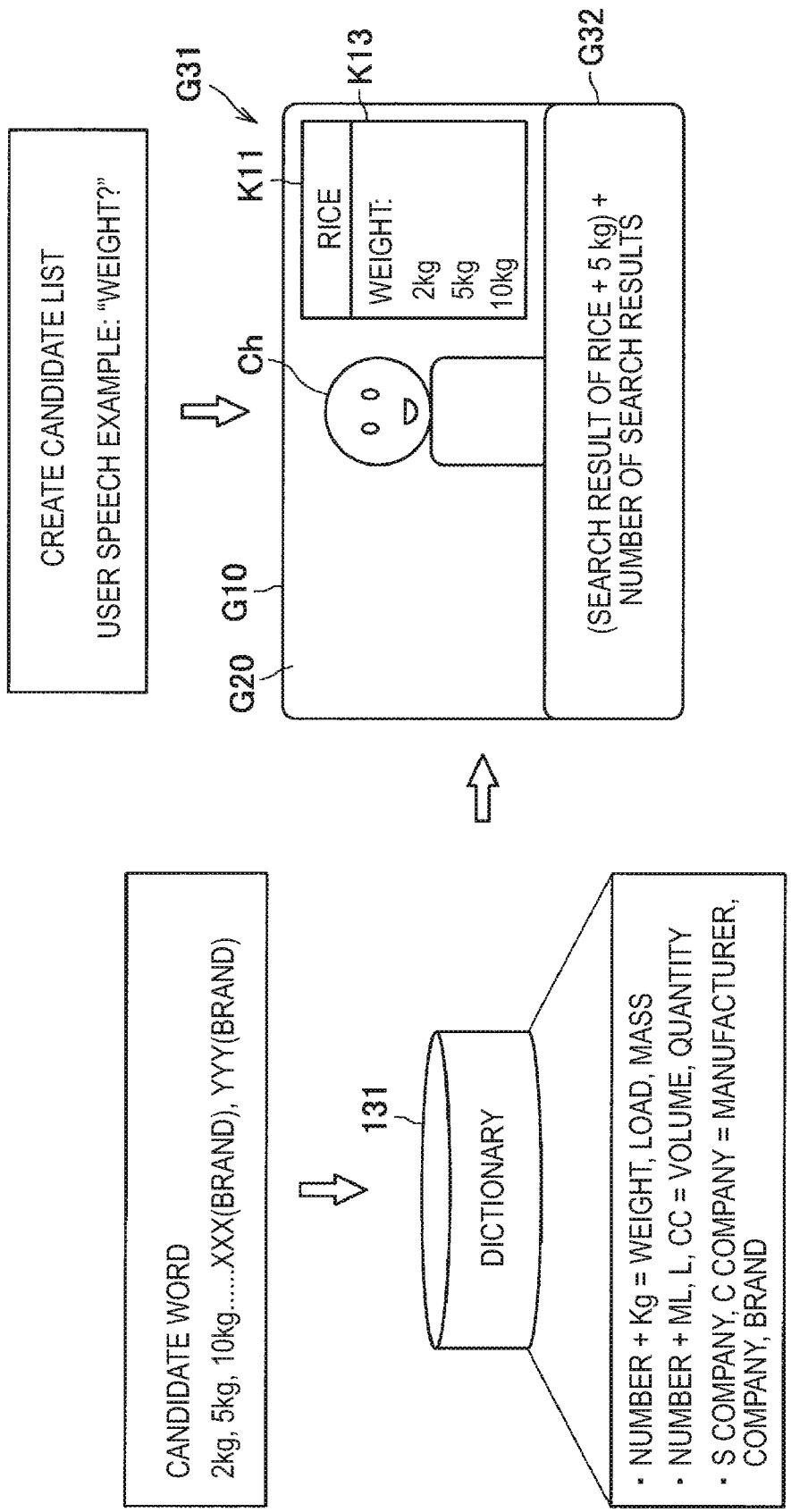
FIG. 16 is a diagram for describing an example in which all in a candidate list corresponding to attribute information included in a third voice recognition result are provided to a user for each piece of attribute information.

FIG. 16 is a diagram for describing an example in which all in a candidate list corresponding to attribute information included in a third voice recognition result are provided to a user for each piece of attribute information. In addition, similarly to the example illustrated in FIG. 15, FIG. 16 illustrates that "2 kg, 5 Kg, 10 kg, . . . , XXX (brand), YYY (brand)" and the like are assumed as examples of a plurality of candidate words. A plurality of such candidate words are prepared in advance. In addition, FIG. 16 illustrates that registration is performed for the dictionary 131 similarly to the example illustrated in FIG. 15.

Next, as illustrated in FIG. 16, when a user says "I want to buy rice" in inputting a main key and says "weight?" before inputting a filter key, in the agent 10, the data acquisition section 121 acquires a candidate list including one or more candidate words corresponding to the first input word "rice" and corresponding to the attribute information "weight." The provision section 123 causes the search key K11 "rice" to be displayed in the search key display area G31, and causes the candidate list K13 corresponding to the attribute information "weight" to be displayed in the search key display area G31.

For example, in the case where the weight "3 kg" that is not present in the candidate list is said to input a filter key, "2 kg" that is the closest to the user speech "3 kg" may be automatically selected. In addition, this example assumes "weight?" as user speech to specify an attribute. However, user speech to specify an attribute is not limited to "weight?" but may also be "manufacturer?" or the like. In addition, as described above, a plurality of candidate words may be displayed in any order. For example, a plurality of candidate words may be displayed in the descending order of search frequency, in the ascending order of product quantity, or in the descending order of purchase frequency.

Here, a search key that has to be input by a user may be defined in advance for each product. At this time, in the case where there is a search key that has to be input, but has not yet been input, the user may speak to specify an attribute of the search key. In the case where there are a plurality of such search keys, the user may decide the designation order of attributes in accordance with the order of suggestions (descending order of use frequency as a filter key) or the degree of necessity.

The above chiefly describes the case where a user says something related to product purchasing. However, in the state in which the agent 10 is capable of receiving user speech, a user can also say something unrelated to product purchasing. Then, the agent 10 may determine whether or not the user speech is related to product purchasing.

For example, in the case where a speech form related to product purchasing is defined like "Add XXX," it is possible to determine in accordance with this form whether or not user speech is related to product purchasing. However, a natural, context-aware dialogue similar to conversation between people is more desirable.

Then, the provision section 123 favorably provides a process result to a user only in the case where an input word included in a voice recognition result corresponds to the state of an application. If so, an input word that does not correspond to the state of the application is blocked as an invalid word. The following refers to an input word that does not correspond to the state of an application as invalid word, and refers to an input word that corresponds to the state of an application as valid word in some cases. That is, the valid word may be regarded as an input word that is used for operating an application.

More specifically, the agent 10 grasps one or more candidate words corresponding to the state of an application (e.g., state of filtering products) in advance on the basis of data registered in the dictionary 131. Therefore, only in the case where an input word included in a voice recognition result matches any of these candidate words, the provision section 123 can add the candidate word to the search key.

Blocking an invalid word in this way is considered to work effectively even in the state in which the accuracy of a voice recognition process on user speech is low (e.g., even in the case where external noise or the like is included).

In addition, in the case where there is another user having conversation near a user, or the like, it can be difficult to distinguish user speech from the conversation of the other user, and it can be impossible to accurately perform a voice recognition process on the user speech. However, if blocking an invalid word leads to the detection of an input word corresponding to the state of an application irrespective of partial failure in the voice recognition process on the user speech, a process result is normally provided to the user.

Figure 17:
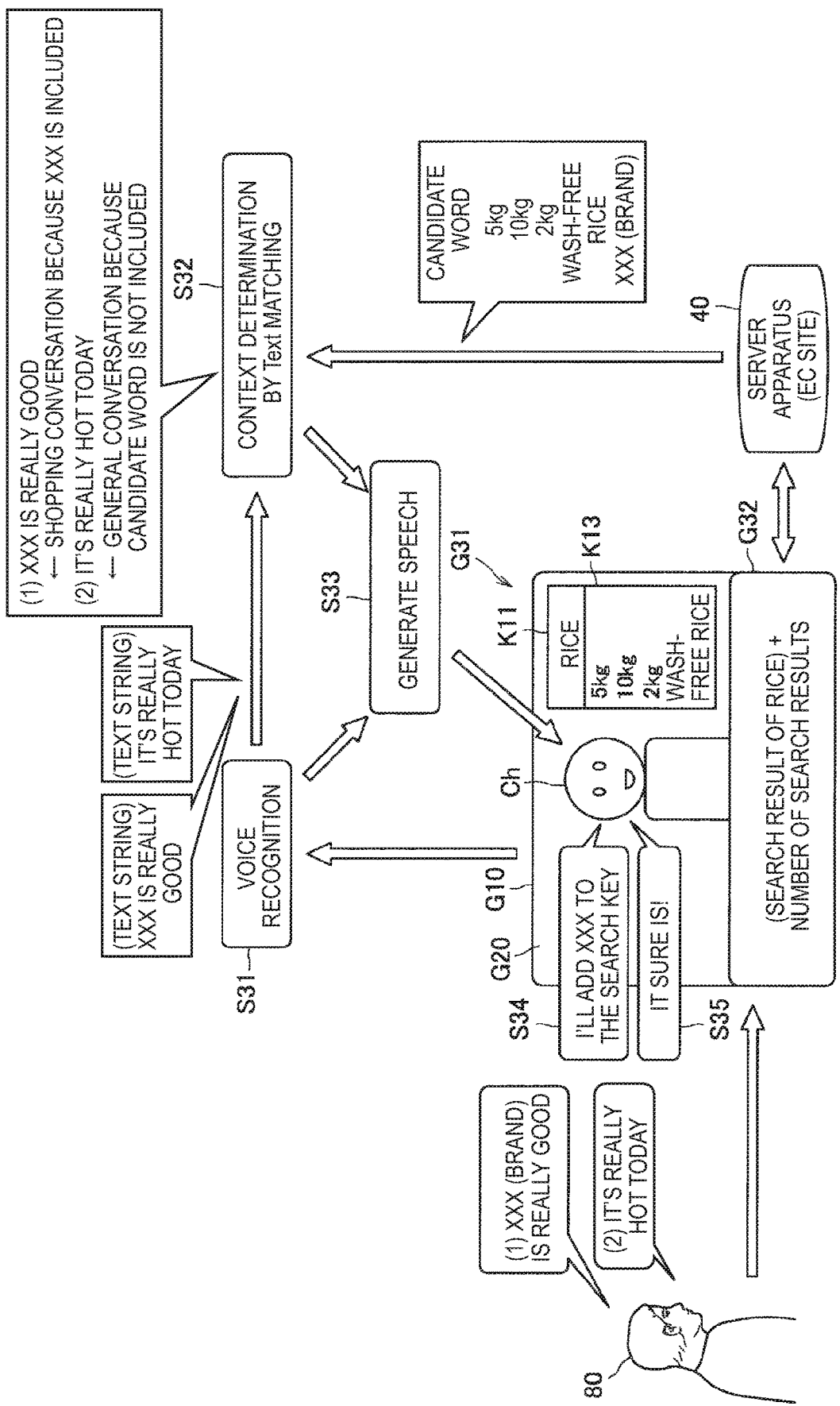
FIG. 17 is a diagram illustrating an operation example in each of cases where user speech includes a valid word, and where no valid word is included.

FIG. 17 is a diagram illustrating an operation example in each of the cases where user speech includes a valid word, and where no valid word is included. Here, the case of the state of filtering products is assumed as a state of an application. An example will be described in which, after the state of filtering products as a state of the application, an input word included in a voice recognition result is determined. Thus, it is considered that, in the case where a user has shopping conversation, a voice recognition result includes a valid word. In the case where a user has general conversation, a voice recognition result includes no valid word. Here, the general conversation may be regarded as conversation that does not include any input word corresponding to the state of an application, that is, conversation that includes no valid word.

As illustrated in FIG. 17, as user speech including a valid word, "(1) XXX (brand) is really good" is assumed. As user speech including no valid word, "(2) It's really hot today" is assumed. When a voice recognition process is performed on each user speech (S31), "XXX is really good" and "It's really hot today" are acquired as TEXT strings.

Here, the agent 10 grasps one or more candidate words corresponding to the state (state of filtering products) of the application in advance on the basis of one or more candidate words provided from the server apparatus (EC site) 40. Therefore, the provision section 123 makes a context determination by Text matching between the TEXT string "XXX is really good" and the TEXT string "It's really hot today" and the one or more candidate words corresponding to the state of the application (S32).

The TEXT string "XXX is really good" includes the input word "XXX," which matches the candidate word "XXX." Therefore, the provision section 123 generates speech indicating that the candidate word "XXX" is added to the search key. Meanwhile, the TEXT string "It's really hot today" does not include the input word that matches the candidate word. Therefore, the provision section 123 generates general speech different from the addition of the candidate word (S33).

Next, the provision section 123 provides, as speech corresponding to "(1) XXX (brand) is really good," speech such as "I'll add XXX to the search key" indicating that the candidate word "XXX" is added to the search key. Meanwhile, the provision section 123 provides, as speech corresponding to "(2) It's really hot today," speech such as "It sure is!" as an example of the general speech different from the addition of the candidate word. Speech may be provided as at least any one of visual information or voice information.

Figure 18:
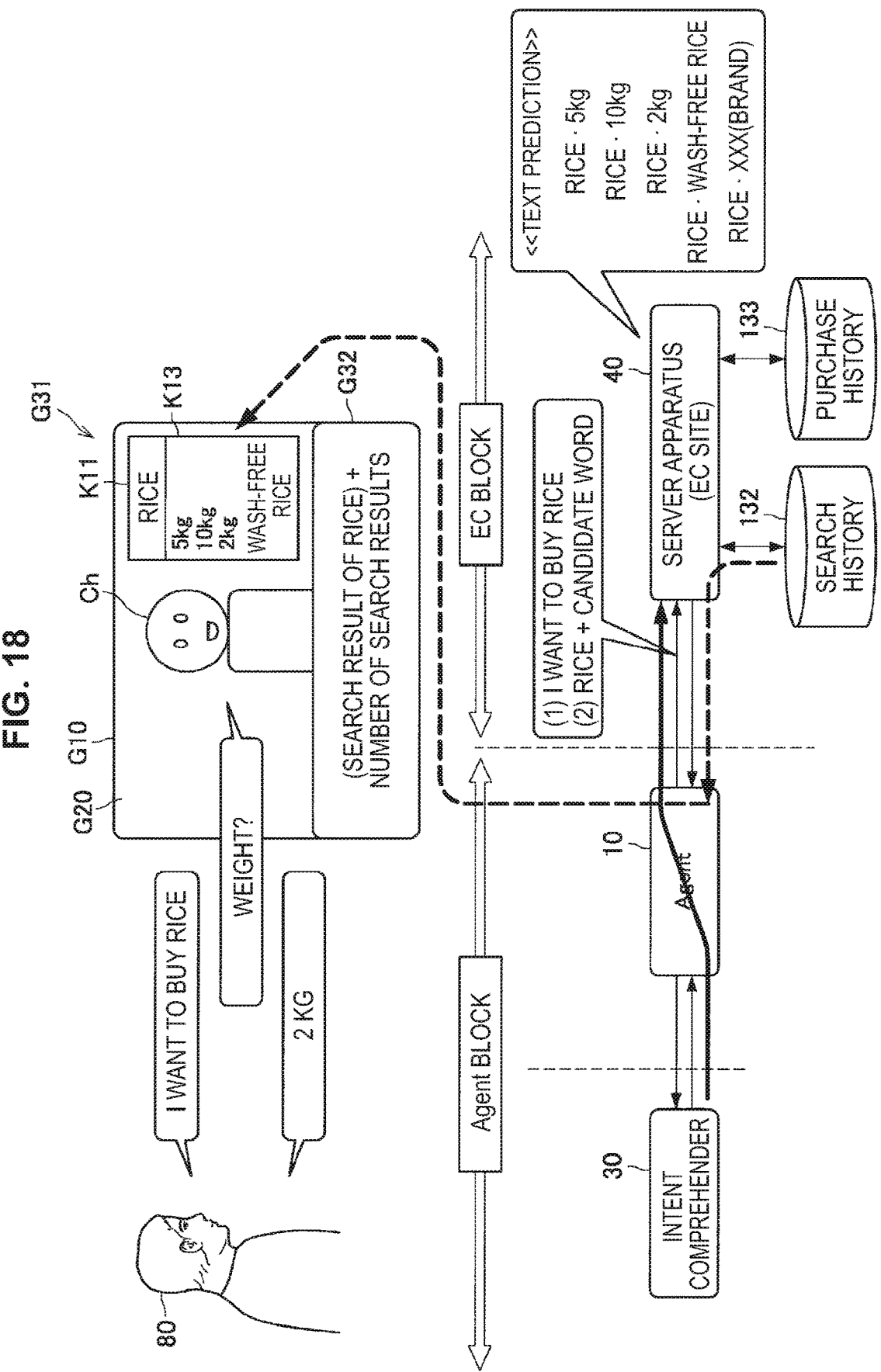
FIG. 18 is a diagram illustrating a configuration example of a system in a case where a candidate list is provided to a user.

FIG. 18 is a diagram illustrating a configuration example of a system in the case where a candidate list is provided to a user. As illustrated in FIG. 18, when a user says "I want to buy rice," in the agent 10, the data acquisition section 121 acquires the user speech "I want to buy rice" via the voice input section 113 and the recognition section 122 recognizes "I want to buy rice" as a voice recognition result. The intent comprehender 30 is notified of the voice recognition result "I want to buy rice" and the application state.

Examples of the application state include a "search state," a "product list display state," and the like. The intent comprehender 30 interprets the intent of the voice recognition result "I want to buy rice" in accordance with the application state. An intent interpretation result is provided from the intent comprehender 30 to the agent 10. The agent 10 instructs the server apparatus (EC site) 40 to perform a process of setting "rice" in the search key as a process corresponding to the intent interpretation result.

In the server apparatus (EC site) 40, on the basis of at least any one of a search history 132 or a purchase history 133, the candidate list K13 is generated, and the candidate list K13 is provided to the agent 10. In the agent 10, the candidate list K13 is provided to a user, and the speech of any of a plurality of candidate words included in the candidate list K13 is received. Here, it is assumed that the candidate word "2 kg" is said by a user.

The provision section 123 adds the candidate word (2 kg) to the search key, and provides the search keys "rice, candidate word (2 kg)" to the server apparatus (EC site) 40.

The server apparatus (EC site) 40 conducts a search using the search keys "rice, candidate word (2 kg)," and a search result is provided to the agent 10. In the agent 10, the provision section 123 provides the search result and the number of search results to the user.

Figure 19:
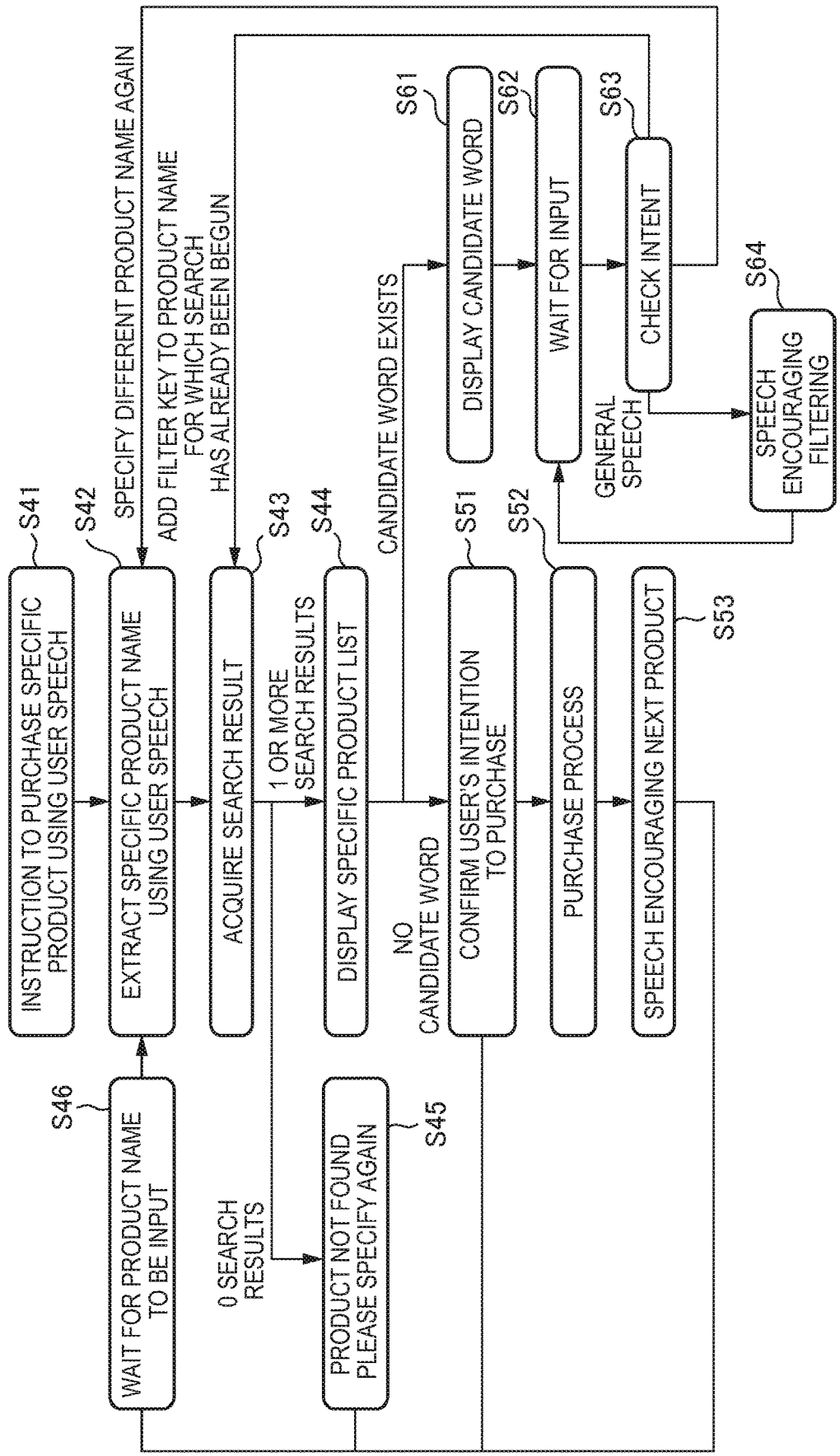
FIG. 19 is a flowchart illustrating an operation example of an agent related to purchase of a product using an EC site.

Next, an operation example of the agent 10 related to the purchase of a product which uses an EC site will be described. FIG. 19 is a flowchart illustrating an operation example of the agent 10 related to purchase of a product using an EC site. As illustrated in FIG. 19, when an instruction to purchase a specific product using user speech is issued (S41), a specific product name using user speech is extracted (S42). The agent 10 acquires a search result using the specific product name (S43).

In the case where the number of search results is "0 search results," the agent 10 provides the user with the message "Product not found. Please specify again." encouraging the user to input the product name (S45). The agent 10 waits for the product name to be input (S46), and then transitions to S42. Meanwhile, in the case where the number of search results is "1 or more search results," the agent 10 displays a specific product list (S44). In the case where there is no candidate word corresponding to the specific product name, the agent 10 transitions to S51. In the case where there is a candidate word corresponding to the specific product name, the agent 10 transitions to S61.

In the case where there is no candidate word corresponding to the specific product name, the agent 10 confirms the user's intention to purchase (S51). When the intention to purchase is confirmed, the agent 10 performs a purchase process (S52), speaks to encourage the next product (S53), and transitions to S46. Meanwhile, in the case where there is a candidate word corresponding to the specific product name, the agent 10 displays the candidate word (S61) and waits for user speech to be input (S62). When user speech is input, the agent 10 checks the intent of the user speech (S63).

In the case where the user speech includes no input word that matches the candidate word, the agent 10 interprets that the user speech is general conversation, speaks to encourage products to be filtered (S64), and transitions to S62. Meanwhile, in the case where the user speech includes an input word that matches the candidate word, the agent 10 adds the candidate word to the product name for which a search has already been begun as a filter key, and transitions to S43. In the other cases (e.g., in the case of speech that agrees with a supercategory of the product), the agent 10 makes the user specify again a product name different from the product name for which a search has already been begun, and transitions to S42.

Figure 20:
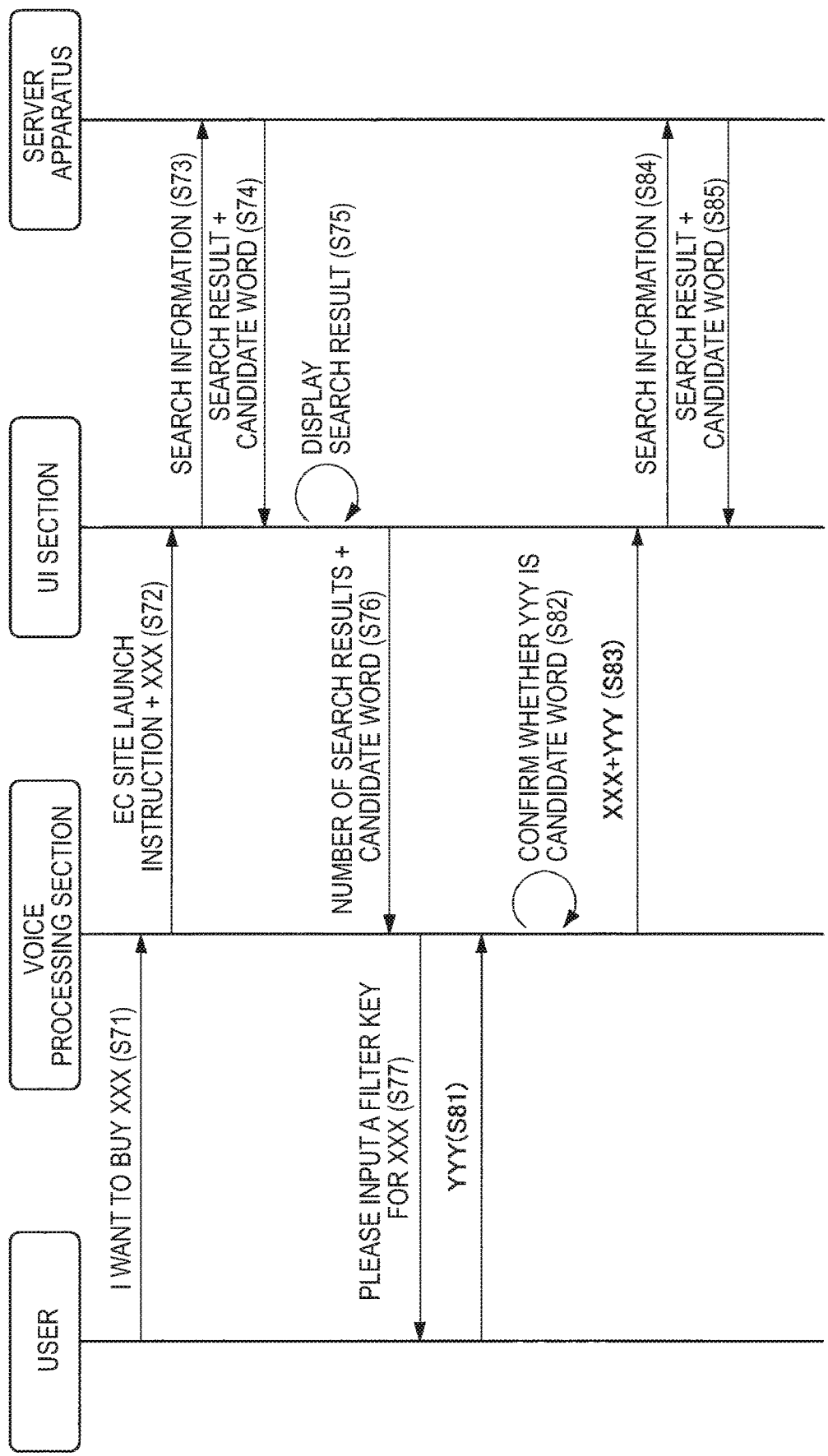
FIG. 20 is a sequence diagram illustrating an operation example of an entire system related to purchase of a product using the EC site.

Next, an operation example of the entire system related to the purchase of a product which uses an EC site will be described. FIG. 20 is a sequence diagram illustrating an operation example of the entire system related to the purchase of a product using the EC site. The agent 10 includes a voice processing section and a UI section. As illustrated in FIG. 20, the case will be assumed where a user says "I want to buy XXX" (S71). At this time, the agent 10 receives the user speech "I want to buy XXX." In the voice processing section, the product name "XXX" is extracted from the user speech "I want to buy XXX." The voice processing section outputs an EC site launch instruction and the product name "XXX" to the UI section (S72). When the UI section receives the EC site launch instruction, the UI section outputs search information including the product name "XXX" to the server apparatus (EC site) 40 (S73).

The server apparatus (EC site) 40 conducts a search by using the product name "XXX," and returns a search result and a candidate word corresponding to the product name "XXX" to the UI section (S74). The UI section displays the search result (S75) and displays the candidate word. The UI section outputs the number of search results and the candidate word to the voice processing section (S76). The voice processing section says the guidance "Please input a filter key for XXX" encouraging a filter key to be input (S77). The voice processing section waits for user speech.

When the user says "YYY" (S81), the voice processing section confirms whether or not "YYY" is a candidate word (S82). Note that it may be confirmed by the server apparatus (EC site) 40 whether or not "YYY" is a candidate word. In the case where "YYY" is a candidate word, the voice processing section outputs the product name "XXX" and the candidate word "YYY" to the UI section. The UI section outputs search information including the search keys "XXX+YYY" to the server apparatus (EC site) 40 (S84). The server apparatus (EC site) 40 uses the search keys "XXX+YYY" to conduct a search, and returns a search result and a candidate word corresponding to the search keys "XXX+YYY" to the UI section (S85).

(1.3.8. Selection of Attribute Information)

Figure 21:
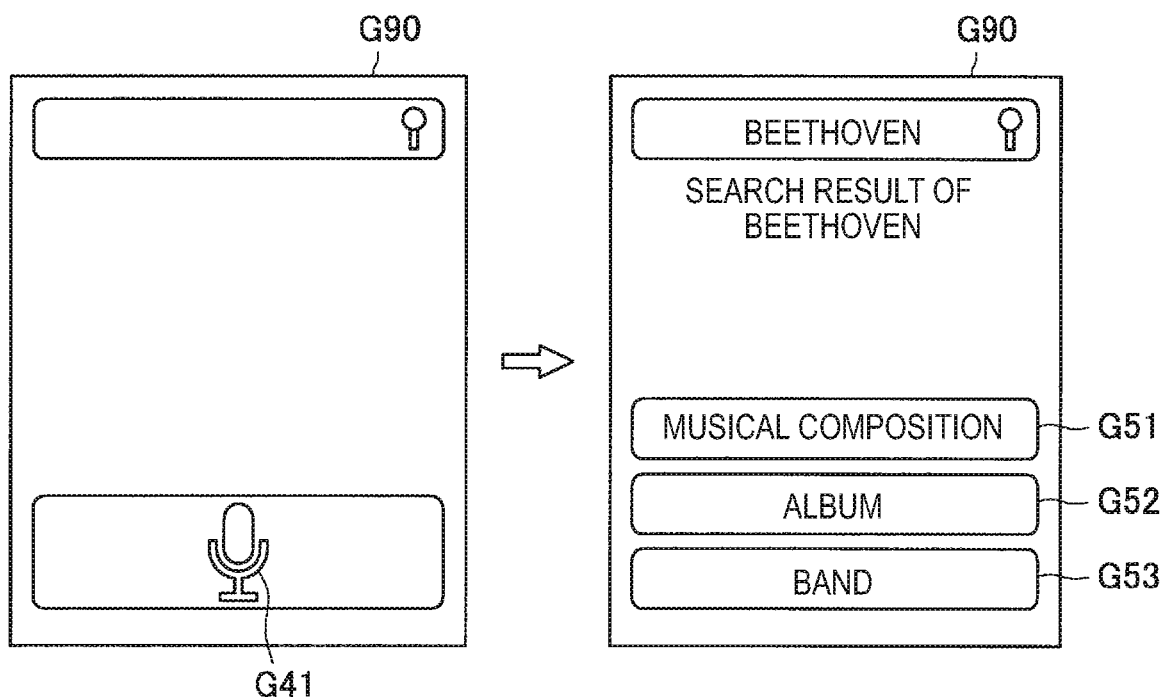
FIG. 21 is a diagram illustrating an example of a screen that is generally used for search.

The above describes an example in which speech from a user generates a search key. However, it is sometimes difficult to determine from only text recognized from the speech from the user what is meant by the text. FIG. 21 is a diagram illustrating an example of a screen G90 that is generally used for search. As illustrated in FIG. 21, the screen G90 includes a microphone icon G41. When a user selects the microphone icon G41 and the speech "Beethoven" is input, the speech "Beethoven" is recognized and "Beethoven" is used to conduct a search.

However, "Beethoven" corresponds to all of a musical composition, an album, and a band. If a search is conducted for all of a musical composition, an album, and a band, a search result is acquired for each of a musical composition, an album, and a band. Accordingly, it is necessary to filter the search results by selecting any of buttons G51 to G53. Then, the following describes technology that makes it possible to easily select attribute information such as a musical composition, an album, and a band.

Note that the following chiefly assumes the case where the non-voice input section 114 includes a touch panel on which the display section 150 displays a screen, and detects a variety of operations. However, the non-voice input section 114 is not limited to a touch panel. For example, the non-voice input section 114 may include a button capable of detecting a depression operation. Alternatively, the non-voice input section 114 may include an imaging apparatus capable of detecting a variety of operations from a gesture or a line of sight recognized from a captured image. Alternatively, the non-voice input section 114 may include a motion sensor (such as an acceleration sensor or a gyro sensor) capable of detecting a variety of operations from the motion of a user.

Figure 22:
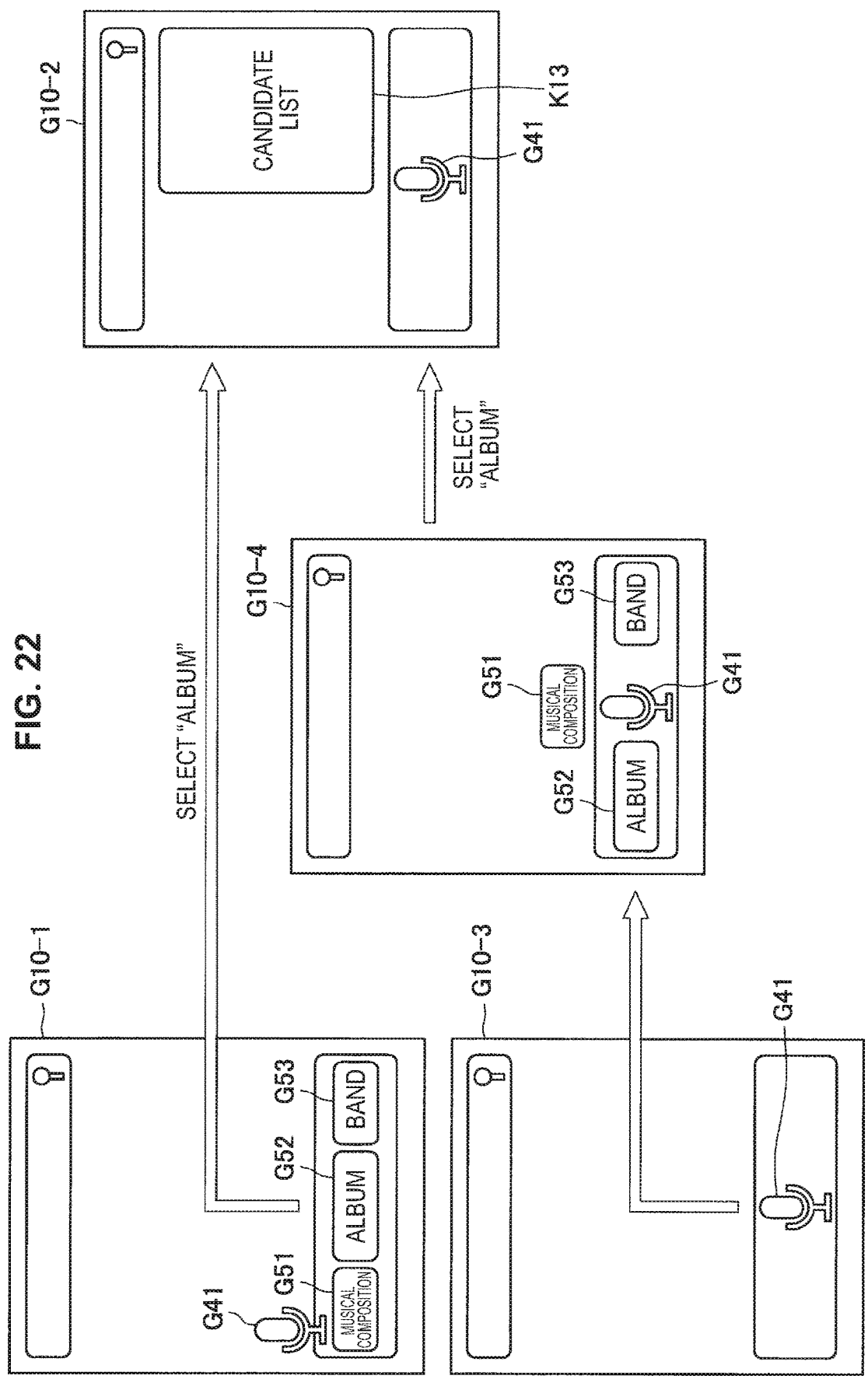
FIG. 22 is a diagram for describing a selection example of the attribute information.

FIG. 22 is a diagram for describing a selection example of attribute information. As illustrated in FIG. 22, a screen G10-1 includes the microphone icon (first voice input section) G41 and the buttons (second voice input sections) G51 to G53 corresponding to attribute information (musical composition, album, and band) associated with the voice input "Beethoven." It is sufficient that there is at least one piece of attribute information. A user can select any piece of attribute information by making an input (touch operation) into the non-voice input section 114.

Alternatively, as illustrated in FIG. 22, while a screen G10-3 including the microphone icon G41 is displayed and the microphone icon G41 is selected, the buttons G51 to G53 corresponding to the attribute information associated with the voice input "Beethoven" may be displayed at positions adjacent to the microphone icon G41 (screen G10-4). The displayed buttons GM to G53 may be defined in advance, or decided depending on a user's preference. A user can select any piece of attribute information by performing a flick operation from the microphone icon G41 to any of the buttons G51 to G53.

In the case where any piece of attribute information is selected on the screen G10-1 or the screen G10-4, the data acquisition section 121 acquires a candidate list including one or more candidate words corresponding to the selected attribute information. For example, in the case where the attribute information "album" is selected, the candidate list K13 corresponding to the attribute information "album" is acquired. The screen G10-2 includes the candidate list K13.

The user can speak with reference to the candidate list K13 corresponding to the attribute information "album." When a voice recognition process is performed on the user speech, the provision section 123 provides the user with a process result based on an intent interpretation result of the voice recognition result on the basis of the candidate list K13 corresponding to the attribute information "album." For example, in the case where any of the candidate words included in the candidate list K13 corresponding to the attribute information "album" is said, a process result based on the intent interpretation of the candidate word is provided to the user.

Figure 23:
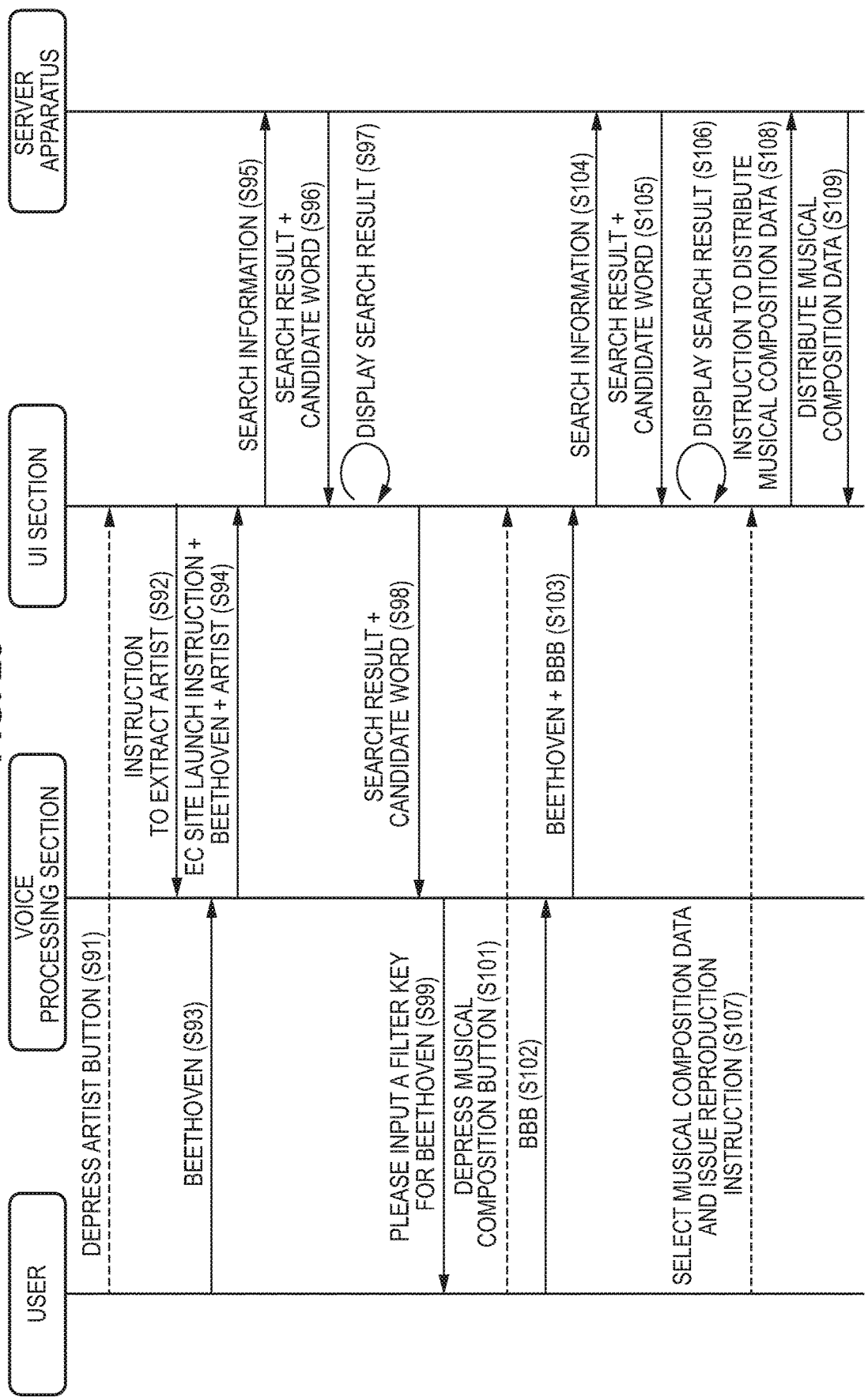
FIG. 23 is a sequence diagram illustrating an operation example of an entire system related to distribution of a musical composition using the EC site.

Next, an operation example of the entire system for distributing a musical composition by using an EC site will be described. FIG. 23 is a sequence diagram illustrating an operation example of an entire system related to distribution of a musical composition using the EC site. The agent 10 includes a voice processing section and a UI section. As illustrated in FIG. 23, the case will be assumed where a user depresses an artist button (S91). The GUI section issues an instruction to extract an artist name from user speech (S92).

Next, the case will be assumed where a user says the artist name "Beethoven" (S93). At this time, the user speech "Beethoven" is input into the agent 10, and in the voice processing section, the artist name "Beethoven" is extracted from the user speech "Beethoven." The voice processing section outputs an EC site launch instruction, the artist name "Beethoven," and information indicating the artist to the UI section (S94). When the UI section receives the EC site launch instruction, the UI section outputs search information including the artist name "Beethoven" and the information indicating the artist to the server apparatus (EC site) 40 (S95).

The server apparatus (EC site) 40 uses the artist name "Beethoven" to conduct a search, and returns a search result and a candidate word corresponding to the artist name "Beethoven" to the UI section (S96). The UI section displays the search result (S97) and displays the candidate word. The UI section outputs the number of search results and the candidate word to the voice processing section (S98). The voice processing section says the guidance "Please input filter key for Beethoven" encouraging a filter key to be input (S99). The voice processing section waits for user speech.

When the user depresses a musical composition button (S101) and the user says "BBB" (S102), the voice processing section confirms whether or not "BBB" is a candidate word. Note that it may be confirmed by the server apparatus (EC site) 40 whether or not "BBB" is a candidate word. In the case where "BBB" is a candidate word, the voice processing section outputs the artist name "Beethoven," the candidate word "BBB," and information indicating a musical composition to the UI section. The UI section outputs search information including the search keys "Beethoven+ BBB" and the information indicating a musical composition to the server apparatus (EC site) 40 (S104). The server apparatus (EC site) 40 uses the search keys "Beethoven+ BBB" to conduct a search, and returns a search result and a candidate word corresponding to the search keys "Beethoven+BBB" to the UI section (S105).

The UI section displays the search result (S106) and displays the candidate word. The UI section outputs the number of search results and the candidate word to the voice processing section. The voice processing section says guidance encouraging musical composition data to be selected. The voice processing section waits for user speech. When the user selects musical composition data and issues a reproduction instruction (S107), the UI section instructs the server apparatus (EC site) 40 to distribute the musical composition data (S108) and the server apparatus (EC site) 40 distributes the musical composition data to the UI section (S109).

Note that the above chiefly assumes the case where attribute information is selected once. However, the case is also assumed where a plurality of pieces of attribute information are hierarchically included. In such a case, following the selection of certain attribute information, it may be possible to select attribute information related to the attribute information. FIG. 24 is a diagram for describing the case where a plurality of pieces of attribute information are hierarchically included. Specifically, the attribute information "Chinese" and "French" are related to the attribute information "dish name"

In such a case, as illustrated in FIG. 24, while the microphone icon G41 is selected, the buttons G61 to G63 corresponding to the attribute information associated with the voice input "Beethoven" may be displayed at positions adjacent to the microphone icon G41 (screen G10-5). A user can select any piece of attribute information by performing a flick operation from the microphone icon G41 to any of the buttons G61 to G63. Then, it is assumed that the button G61 is selected.

In such a case, as illustrated in FIG. 24, while the button G61 is selected, the buttons G71 to G72 corresponding to attribute information associated with the attribute information "dish name" may be displayed at positions adjacent to the button G61 (screen G10-6). A user can select any piece of attribute information "Chinese" and "French" by performing a flick operation from the button G61 to any of the buttons G71 to G72. Then, it is assumed that the button G71 is selected.

In such a case, the attribute information "dish name" and the attribute information "Chinese" are selected. Therefore, a candidate list corresponding to these pieces of attribute information "dish name, Chinese" is considered to have a stronger filtering degree than that of a candidate list that simply corresponds to the attribute information "dish name" Thus, a candidate word desired by a user more can be provided to the user. FIG. 25 is a diagram illustrating an example of a search target and the attribute information (content displayed by flicking) corresponding to the search target.

In the example described above, an example in which a user makes a voice input has been described. However, a similar technique can be applied to not only the case of a voice input, but also the case where a search is conducted on the basis of a manually input search key. FIG. 26 is a diagram for describing the case where a search is conducted on the basis of a search key that is manually input.

FIG. 26 illustrates that a search icon G42 is displayed instead of the microphone icon G41 illustrated in FIG. 24. In the example illustrated in FIG. 26, similarly to the example illustrated in FIG. 24, attribute information can also be selected according to a flick operation, and a candidate list corresponding to the selected attribute information can be provided to a user. The user can select any of the candidate words included in the candidate list corresponding to the attribute information as a new search key.

(1.3.9. Announcement of Supplemental Information)

Figure 27:
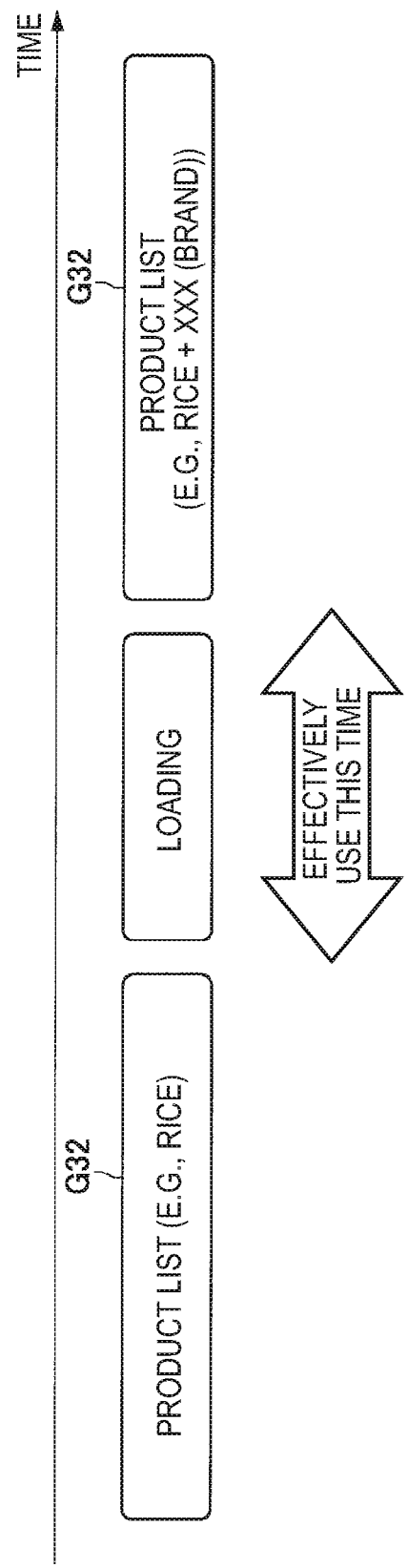
FIG. 27 is a diagram in which image information shows an example of loading time.

Here, the case will be assumed where a process based on an intent interpretation result includes loading image information. In such a case, the time for which image information is loaded is favorably used effectively. FIG. 27 is a diagram in which image information shows an example of loading time. The example illustrated in FIG. 27 assumes the case where a process of adding the filter key "XXX (brand)" to the main key "rice" is performed as a process based on an intent interpretation result.

In the case where this process based on an intent interpretation result includes loading image information, the time for which image information is loaded is favorably used effectively. For example, in the case where the process based on an intent interpretation result includes loading image information, the provision section 123 may provide a user with predetermined supplemental information corresponding to an input word (e.g., "rice" or the like) included in the intent interpretation result as voice information while loading the image information. The supplemental information is not limited in particular, but may be such information or the like that it is possible to filter "rice" in the ascending order of price.

The above describes a detailed function of the agent 10 according to the present embodiment.

[1.4. Hardware Configuration Example]

Figure 28:
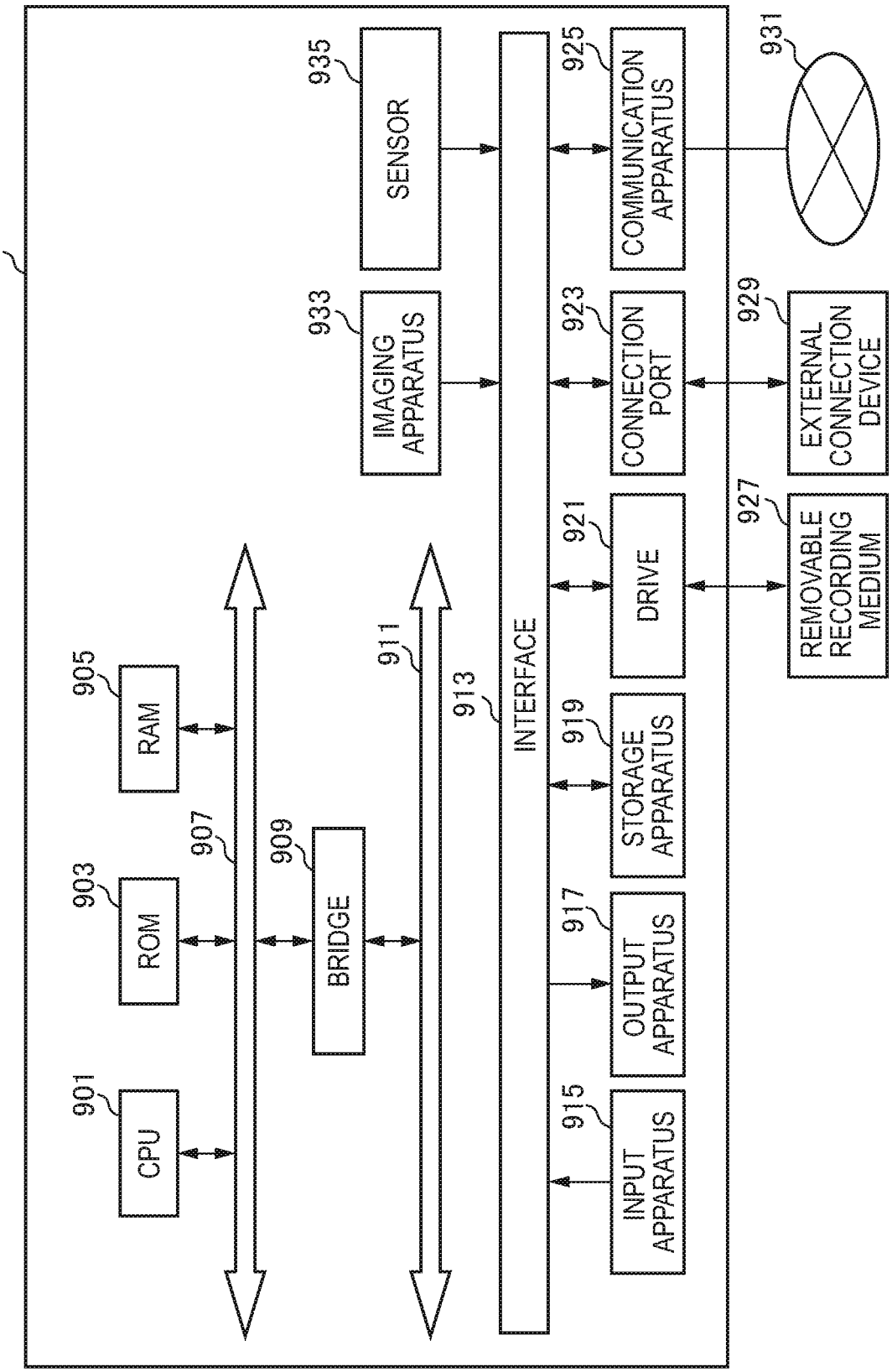
FIG. 28 is a block diagram illustrating a hardware configuration example of the information processing apparatus.

Next, the hardware configuration of the information processing apparatus (agent) 10 according to an embodiment of the present disclosure will be described with reference to FIG. 28. FIG. 28 is a block diagram illustrating a hardware configuration example of the information processing apparatus 10 according to an embodiment of the present disclosure.

As illustrated in FIG. 28, the information processing apparatus 10 includes a central processing unit (CPU) 901, read only memory (ROM) 903, and random access memory (RAM) 905. In addition, the information processing apparatus 10 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 10 may include an imaging apparatus 933 and a sensor 935 as necessary. The information processing apparatus 10 may include a processing circuit as referred to as digital signal processor (DSP) or application specific integrated circuit (ASIC) instead of or along with the CPU 901.

The CPU 901 functions as an operation processing apparatus and a control apparatus, and controls all or some of the operations in the information processing apparatus 10 in accordance with a variety of programs recorded on the ROM 903, the RAM 905, the storage apparatus 919, or a removable recording medium 927. The ROM 903 stores a program, an operation parameter, and the like which are used by the CPU 901. The RAM 905 temporarily stores a program that is used in the execution of the CPU 901, a parameter that appropriately varies in the execution, and the like. The CPU 901, the ROM 903, and the RAM 905 are connected to each other by the host bus 907 including an internal bus such as a CPU bus. Moreover, the host bus 907 is connected to the external bus 911 such as a peripheral component interconnect/interface (PCI) bus via the bridge 909.

The input apparatus 915 is an apparatus that is operated by a user, such as a mouse, a keyboard, a touch panel, a button, a switch, and a lever. The input apparatus 915 may include a microphone configured to detect speech of a user. The input apparatus 915 may be, for example, a remote control apparatus using infrared light or other radio waves, or may be an external connection device 929 such as a mobile phone operable in response to the operation of the information processing apparatus 10. The input apparatus 915 includes an input control circuit that generates an input signal on the basis of information input by a user and outputs the input signal to the CPU 901. By operating this input apparatus 915, a user inputs various kinds of data to the information processing apparatus 10 or requires a processing operation. In addition, the imaging apparatus 933 described below can also function as the input apparatus by imaging the movement of a hand of a user, imaging a finger of a user, or the like. At this time, a pointing position may be decided in accordance with the movement of a hand or the orientation of a finger.

The output apparatus 917 includes an apparatus capable of visually or aurally notifying a user of acquired information. The output apparatus 917 can include, for example, a display apparatus such as a liquid crystal display (LCD), a plasma display panel (PDP) and an organic electro-luminescence (EL) display, an audio output apparatus such as a speaker and a headphone, a printer apparatus, and the like. The output apparatus 917 outputs a result obtained according to the processing of the information processing apparatus 10 in a form of video such as text or an image, and speech such as speech or audio. In addition, the output apparatus 917 may include a light or the like to illuminate the surroundings.

The storage apparatus 919 is an apparatus for data storage which is configured as an example of a storage section of the information processing apparatus 10. The storage apparatus 919 includes, for example, a magnetic storage device such as a hard disk drive (HDD), a semiconductor storage device, an optical storage device, a magneto-optical storage device, or the like. This storage apparatus 919 stores a program to be executed by the CPU 901, various types of data, various types of data acquired from the outside, and the like.

The drive 921 is a reader/writer for the removable recording medium 927 such as a magnetic disk, an optical disc, a magneto-optical disk, or a semiconductor memory, and is built in the information processing apparatus 10 or externally attached thereto. The drive 921 reads out information recorded in the removable recording medium 927 attached thereto, and outputs the read-out information to the RAM 905. In addition, the drive 921 writes record into the removable recording medium 927 attached thereto.

The connection port 923 is a port used to directly connect a device to the information processing apparatus 10. The connection port 923 can include, for example, a universal serial bus (USB) port, an IEEE1394 port, and a small computer system interface (SCSI) port. In addition, the connection port 923 may also include an RS-232C port, an optical audio terminal, a high-definition multimedia interface (HDMI) (registered trademark) port, and the like. The connection of the external connection device 929 to the connection port 923 makes it possible to exchange various kinds of data between the information processing apparatus 10 and the external connection device 929.

The communication apparatus 925 is, for example, a communication interface including a communication device or the like for a connection to a communication network 931. The communication apparatus 925 can be, for example, a communication card or the like for a wired or wireless local area network (LAN), Bluetooth (registered trademark), or a wireless USB (WUSB). In addition, the communication apparatus 925 may be a router for optical communication, a router for an asymmetric digital subscriber line (ADSL), a modem for various kinds of communication, or the like. The communication apparatus 925 transmits a signal to and receives a signal from, for example, the Internet or other communication devices on the basis of a predetermined protocol such as TCP/IP. In addition, the communication network 931 connected to the communication apparatus 925 is a network connected in a wired or wireless manner, and is, for example, the Internet, a home LAN, infrared communication, radio wave communication, satellite communication, or the like.

The imaging apparatus 933 is an apparatus that generates a captured image by imaging a real space using an image sensor such as a charge coupled device (CCD) or complementary metal oxide semiconductor (CMOS), for example, and various members such as a lens for controlling the formation of an object image on the image sensor, for example. The imaging apparatus 933 may be an apparatus that captures a still image, or may be an apparatus that captures a moving image.

The sensor 935 includes various sensors such as a ranging sensor, an acceleration sensor, a gyro sensor, a geomagnetic sensor, an optical sensor, and a sound sensor, for example. The sensor 935 acquires information regarding a state of the information processing apparatus 10, such as the attitude of the housing of the information processing apparatus 10, for example, and information regarding an environment around the information processing apparatus 10, such as the brightness and noise around the information processing apparatus 10. In addition, the sensor 935 may also include a global positioning system (GPS) sensor that receives GPS signals and measures the latitude, longitude, and altitude of the apparatus.

[1.5. Supplemental Information]

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

(1.5.1. Details of Modification for Math Calculation)

In the case where the agent 10 performs voice recognition for math calculation, the agent 10 may predictively display mathematical symbols according to recognized keywords, similarly to suggestions on an EC site. In this modification, the agent 10 may recognize only keywords related to calculation such as mathematical symbols and numbers recognized according to recognized keywords.

(1.5.2. Supplemental Notes 1)

An embodiment of the present disclosure may be applied to a specific apparatus, method, program, system, recording medium, and the like. For example, it is also possible to manufacture a program for causing hardware such as a CPU, a ROM, and a RAM built in a computer to perform a function equivalent to the function of the control section 120 described above. In addition, there can also be provided a computer-readable recording medium having the program recorded thereon.

In addition, voice can be acquired directly/indirectly from a terminal in proximity to the user. In addition, the intent of a voice recognition result may be comprehended by either the terminal or cloud computing. Various processes, not only limited to the intent comprehension of a voice recognition result, may also be executed by a processing section external to the terminal, such as cloud computing. As a specific example, the recognition section 122 or the like may also be provided to a server or the like that is not illustrated, but connected via the communication network 931. In this case, the agent 10 can correspond to a client connected to the server via the communication network 931.

(1.5.3. Supplemental Notes 2)

According to an embodiment and a modification of the present disclosure, for example, it is possible to determine whether a voice input is made or a voice instruction is issued for the agent 10 for text composition. Examples of text composition include writing a novel and creating a business document.

(1.5.4. Supplemental Notes 3)

In an embodiment of the present disclosure, an intent interpretation mode may be decided on the basis of image recognition information of a real space. If image recognition information about the real space is acquired, the intent interpretation mode may be decided on the basis of user gestures or environment information including real objects. In addition, the intent interpretation mode may also be decided on the basis of a real object used for a specific purpose included in the image recognition information. The specific object is not limited to real objects provided in a typical home, such as electric appliances and cooking utensils. For example, real objects for specialized purposes, such as medical instruments, may also be recognized.

Alternatively, the intent interpretation mode may be decided on the basis of information about the operation of a button on the terminal by the user.

(1.5.5. Supplemental Notes 4)

Alternatively, an intent interpretation mode may be decided on the basis of information related to a specific device. One such case is the example of the so-called IoT at home. Alternatively, in the case where a process is conducted by linkage between specific devices, the intent interpretation input mode may be decided on the basis of status information about the linked devices. For example, an intent interpretation mode corresponding to an activated device (e.g., coffee maker, rice cooker, and the like) may be decided. Here, the linkage between devices may be either wired or wireless.

(1.5.6. Supplemental Notes 5)

An embodiment of the present disclosure can also be applied to medical applications. In medical applications, there is demand for a user to perform contactless operating input on a terminal during surgery and the like, and thus it is effective for keywords to be recognized smoothly. In addition, being able to perform contactless operating input is also effective from the perspective of preventing infectious diseases.

(1.5.7. Supplemental Notes 6)

In addition, an embodiment of the present disclosure can be applied to factories, vehicles, agriculture, and the like in addition to medical applications. For example, for vehicles, particularly passenger vehicles, the intent interpretation mode may be decided on the basis of information about the vehicle's running state (such as speed, acceleration, temperature, state of charge (SOC), and remaining fuel), navigation information, in-car sound information (such as voice and music), and the like. For example, when the vehicle is running, keywords chiefly related to traffic information and map information may be made to be recognized. Keywords related to entertainment such as music may be recognized only when the vehicle is stopped. When there is a malfunction in any component of the vehicle, keywords related to the malfunction may also be recognized.

(1.5.8. Supplemental Notes 7)

In addition, in the case of acquiring attribute information for a plurality of users, the keywords to be recognized may be switched according to the attribute information of each user. In other words, at a certain point in time, a different intent interpretation mode may be set for each user.

(1.5.9. Supplemental Notes 8)

Recognized keywords and unrecognized keywords may also be displayed distinctly. In this case, it is sufficient for the unrecognized keywords to be only slightly visible to the user. For example, the visibility of recognized keywords may be set higher than the visibility of unrecognized keywords. In this case, the visibility may be changed by changing the lightness, brightness, size, or thickness, for example. For example, to changing visibility, various methods may be adopted such as changing the font type, changing the font chroma (color), changing the font size, adding a display process such as bold, italics, or underline, or adding animation to the font.

(1.5.10. Supplemental Notes 9)

The agent 10 uses at least one of visual information or voice information to provide information indicating an intent interpretation mode. In addition, the agent 10 differentiates an intent interpretation result to be provided in accordance with voice recognition on the basis of information indicating an intent interpretation mode which is being provided/has been provided. In this case, it is sufficient for the intent interpretation result to be provided by using at least one of the visual information and the voice information. In the case where information indicating an intent interpretation mode is different, the agent 10 differentiates at least part of an intent interpretation result to be provided.

The agent 10 provides visual information of an intent interpretation result on the basis of information indicating an intent interpretation mode. In the case where the intent interpretation mode is different, the agent 10 differentiates at least part of the intent interpretation result to be provided in accordance with voice recognition. In this case, information indicating the intent interpretation mode may be provided to the user by using at least one of the visual information and the voice information, or does not have to be provided to the user. In other words, it is sufficient for the information indicating the set intent interpretation mode to be acquired, and the acquired information indicating the intent interpretation mode does not have to be provided to the user.

(1.5.11. Supplemental Notes 10)

Further, the effects described in this specification are merely illustrative or exemplified effects, and are not limitative. That is, with or in the place of the above effects, the technology according to the present disclosure may achieve other effects that are clear to those skilled in the art from the description of this specification.

(1.5.12. Supplemental Notes 11)

Additionally, the present disclosure may also be configured as below.

(1)

An information processing apparatus including:

a data acquisition section configured to acquire related information related to display information displayed by a display apparatus; and a provision section configured to, when intent of a voice recognition result is interpreted in accordance with the related information, provide a user with a process result based on an intent interpretation result.

(2)

The information processing apparatus according to (1), in which the display information includes at least one of first display information related to first related information or second display information related to second related information, and an intent interpretation result corresponding to the first related information is different from an intent interpretation result corresponding to the second related information different from the first related information.

(3)

The information processing apparatus according to (1) or (2), in which when an intent interpretation mode of a voice recognition result is decided in accordance with the related information, the provision section provides a user with information indicating the intent interpretation mode.

(4)

The information processing apparatus according to (3), in which the information indicating the intent interpretation mode includes at least any one of a character image, an icon image, a background image, or BGM.

(5)

The information processing apparatus according to any one of (1) to (4), in which the provision section provides the process result to the user as at least one of visual information or voice information.

(6)

The information processing apparatus according to (5), in which the provision section provides the user with voice information different between a case where the user is watching the display information and a case where the user is not watching the display information.

(7)

The information processing apparatus according to (6), in which the provision section provides the user with more detailed voice information in the case where the user is not watching the display information than in the case where the user is watching the display information.

(8)

The information processing apparatus according to (7), in which the provision section provides the process result to the user as at least visual information in the case where the user is watching the display information, and provides voice information corresponding to the visual information to the user as the detailed voice information in the case where the user is not watching the display information.

(9)

The information processing apparatus according to any one of (1) to (8), in which when intent of a first voice recognition result is interpreted in accordance with the related information, the data acquisition section acquires a candidate list including one or more candidate words corresponding to a first input word included in an intent interpretation result, and the provision section provides, on a basis of the candidate list, the user with a process result based on an intent interpretation result of a second voice recognition result acquired after the first voice recognition result.

(10)

The information processing apparatus according to (9), in which in a case where a second input word included in the second voice recognition result is included in the candidate list and in a case where an instruction word regarding a process on the second input word is not included in the second voice recognition result, the provision section provides the user with the process result based on the intent interpretation result corresponding to the second input word.

(11)

The information processing apparatus according to (9) or (10), in which in a case where a second input word included in the second voice recognition result is not included in the candidate list and in a case where an instruction word regarding a process on the second input word is included in the second voice recognition result, the provision section provides the user with the process result based on the intent interpretation result corresponding to the second input word.

(12)

The information processing apparatus according to (10) or (11), in which in a case where the second input word included in the second voice recognition result is not included in the candidate list and in the case where the instruction word is not included in the second voice recognition result, the provision section ignores the second input word.

(13)

The information processing apparatus according to any one of (9) to (11), in which the provision section provides at least part of the candidate list to the user, and in a case where attribute information is included in a third voice recognition result acquired before the second voice recognition result, the provision section provides the user with the at least part of the candidate list corresponding to the attribute information.

(14)

The information processing apparatus according to any one of (9) to (11), in which the provision section provides at least part of the candidate list to the user for each piece of attribute information corresponding to the candidate list.

(15)

The information processing apparatus according to any one of (1) to (8), including:

a voice input section; and a non-voice input section, in which in a case where at least one piece of attribute information associated with a voice input and displayed by the display apparatus is selected by an input into the non-voice input section, the data acquisition section acquires a candidate list including one or more candidate words corresponding to the selected attribute information, and the provision section provides the user with a process result based on an intent interpretation result of the voice recognition result on a basis of the candidate list.

(16)

The information processing apparatus according to (15), in which the non-voice input section is a touch panel, the display apparatus displays a first voice input section on the touch panel, and while the first voice input section is selected according to a touch operation on the touch panel, at least one second voice input section corresponding to the attribute information is displayed at a position adjacent to the first voice input section.

(17)

The information processing apparatus according to any one of (1) to (16), in which only in a case where an input word included in the voice recognition result corresponds to the related information, the provision section provides the process result to the user.

(18)

The information processing apparatus according to any one of (1) to (17), in which in a case where a process based on the intent interpretation result includes loading image information, the provision section provides the user with predetermined supplemental information corresponding to an input word included in the intent interpretation result as voice information while the image information is loaded.

(19)

An information processing method including:

acquiring related information related to display information displayed by a display apparatus; and providing, by a processor, when intent of a voice recognition result is interpreted in accordance with the related information, a user with a process result based on an intent interpretation result.

(20)

A program for causing a computer to function as an information processing apparatus including:

a data acquisition section configured to acquire related information related to display information displayed by a display apparatus; and a provision section configured to, when intent of a voice recognition result is interpreted in accordance with the related information, provide a user with a process result based on an intent interpretation result.

REFERENCE SIGNS LIST 10 information processing apparatus (agent)
111 sound output section
113 voice input section
114 non-voice input section
115 distance detection section
120 control section
121 data acquisition section
122 recognition section
123 provision section
124 processing section
130 storage section
131 dictionary
132 search history
133 purchase history
140 communication section
150 display section
30 intent comprehender
40 server apparatus

The invention claimed is:

1. An information processing apparatus, comprising:
 a display section;
 a data acquisition section configured to:
  acquire a first voice input from a user; and
  acquire first related information corresponding to first display information displayed by the display section;
 a recognition section configured to execute a voice recognition process on the first voice input to output a first voice recognition result; and
 a provision section configured to:
  determine whether the first display information displayed on the display section is watched by the user; and
  output a first process result to the user based on a first intent interpretation result, wherein
   the first intent interpretation result is a result of an interpretation of an intent of the first voice recognition result based on the first related information,
   the first process result is output as visual information in association with first voice information based on the determination that the first display information is watched by the user,
   the first process result is output as second voice information different from the first voice information based on the determination that the first display information is not watched by the user, and
   the second voice information is equivalent to the visual information.

2. The information processing apparatus according to claim 1, wherein
 the data acquisition section is further configured to acquire second display information corresponding to second related information different from the first related information, and
 the first intent interpretation result corresponding to the first related information is different from a second intent interpretation result corresponding to the second related information.

3. The information processing apparatus according to claim 1, wherein
 the data acquisition section is further configured to acquire an intent interpretation mode of the first voice recognition result determined based on the first related information, and
 the provision section is further configured to output information indicating the intent interpretation mode.

4. The information processing apparatus according to claim 3, wherein the information indicating the intent interpretation mode includes at least one of a character image, an icon image, a background image, or a background music (BGM).

5. The information processing apparatus according to claim 1, wherein the second voice information is more detailed voice information compared to the first voice information.

6. The information processing apparatus according to claim 1, wherein
 the second voice information corresponds to the visual information, and
 the visual information corresponds to the first process result.

7. The information processing apparatus according to claim 1, wherein
the data acquisition section is further configured to:
acquire a second voice input from the user; and
acquire a candidate list including at least one candidate word corresponding to a first input word included in a third intent interpretation result,
the recognition section is further configured to execute the voice recognition process on the second voice input to output a second voice recognition result,
the third intent interpretation result is a result of an interpretation of an intent of the second voice recognition result based on the candidate list, and
the provision section is further configured to output second process result based on the third intent interpretation result of the second voice recognition result acquired after the first voice recognition result.

8. The information processing apparatus according to claim 7, wherein
in a case where a second input word included in the second voice recognition result is included in the candidate list and an instruction word regarding a process on the second input word is not included in the second voice recognition result, the provision section is further configured to output the second process result based on the third intent interpretation result corresponding to the second input word.

9. The information processing apparatus according to claim 7, wherein
in a case where a second input word included in the second voice recognition result is not included in the candidate list and an instruction word regarding a process on the second input word is included in the second voice recognition result, the provision section is further configured to output the second process result based on the third intent interpretation result corresponding to the second input word.

10. The information processing apparatus according to claim 8, wherein
in a case where the second input word included in the second voice recognition result is not included in the candidate list and the instruction word is not included in the second voice recognition result, the provision section is further configured to ignore the second input word.

11. The information processing apparatus according to claim 7, wherein
the data acquisition section is further configured to acquire a third voice input from the user,
the recognition section is further configured to execute the voice recognition process on the third voice input to output a third voice recognition result, and
the provision section is further configured to:
output at least part of the candidate list to the user; and
in a case where attribute information is included in the third voice recognition result, output the at least part of the candidate list corresponding to the attribute information, wherein the third voice recognition result is acquired before the second voice recognition result.

12. The information processing apparatus according to claim 7, wherein the provision section is further configured to output at least part of the candidate list to the user for each piece of attribute information corresponding to the candidate list.

13. The information processing apparatus according to claim 1, further comprising:
a first voice input section;
a plurality of second voice input sections; and
a non-voice input section, wherein
in a case where at least one attribute information associated with the first voice input and displayed by the display section is selected as an input in the non-voice input section,
the data acquisition section is further configured to acquire a candidate list including at least one candidate word corresponding to the at least one attribute information, and
the provision section is further configured to output the first process result to the user based on: the first intent interpretation result of the first voice recognition result, and the candidate list.

14. The information processing apparatus according to claim 13, wherein
the non-voice input section is a touch panel,
the display section is further configured to display the first voice input section on the touch panel, and
at a time of selection of the first voice input section based on a touch operation on the touch panel, at least one second voice input section of the plurality of second voice input sections corresponding to the at least one attribute information is displayed at a position adjacent to the first voice input section.

15. The information processing apparatus according to claim 1, wherein
in a case where an input word included in the first voice recognition result corresponds to the first related information, the provision section is further configured to output the first process result to the user.

16. The information processing apparatus according to claim 1, wherein
in a case where the first process result based on the first intent interpretation result includes loading image information, the provision section is further configured to output determined supplemental information corresponding to an input word included in the first intent interpretation result as the first voice information or the second voice information at a time at which the image information is loaded.

17. An information processing method, comprising:
in an information processing apparatus comprising a display section and a processor:
acquiring, by the processor, a voice input from a user;
acquiring, by the processor, related information corresponding to display information displayed by the display section;
executing, by the processor, a voice recognition process on the voice input to produce a voice recognition result;
determining, by the processor, whether the display information displayed on the display section is watched by the user; and
outputting, by the processor, a process result to the user, based on an intent interpretation result, wherein
the intent interpretation result is a result of an interpretation of an intent of the voice recognition result based on the related information,
the process result is output as visual information in association with first voice information based on the determination that the display information is watched by the user,
the process result is output as second voice information different from the first voice information based on the determination that the display information is not watched by the user, and
the second voice information is equivalent to the visual information.

18. A non-transitory computer-readable medium having stored thereon, computer-executable instructions which, when executed by a processor, cause the processor to execute operations, the operations comprising:
acquiring a voice input from a user;
acquiring related information corresponding to display information displayed by a display section;
executing a voice recognition process on the voice input to produce a voice recognition result;
determining whether the display information displayed on the display section is watched by the user; and
outputting a process result based on an intent interpretation result, wherein
the intent interpretation result is a result of an interpretation of an intent of the voice recognition result based on the related information,
the process result is output as visual information in association with first voice information based on the determination that the display information is watched by the user,
the process result is output as second voice information different from the first voice information based on the determination that the display information is not watched by the user, and
the second voice information is equivalent to the visual information.

19. The information processing apparatus according to claim 1, wherein
the first related information comprise state of an application linked to the first display information, and
the state of the application indicates a type of the application or a state of a product list displayed on the display section.

20. An information processing apparatus, comprising:
a first voice input section;
a plurality of second voice input sections;
a non-voice input section, wherein the non-voice input section is a touch panel;
a data acquisition section configured to:
acquire a voice input from a user;
acquire related information corresponding to display information; and
acquire a candidate list including at least one candidate word corresponding to at least one attribute information in a case where the at least one attribute information associated with the voice input is selected as an input in the non-voice input section;
a display section configured to:
display the first voice input section on the touch panel; and
display at least one second voice input section of the plurality of second voice input sections corresponding to the at least one attribute information at a position adjacent to the first voice input section at a time of selection of the first voice input section based on a touch operation on the touch panel;
a recognition section configured to execute a voice recognition process on the voice input to output a voice recognition result; and
a provision section configured to:
determine whether the display information displayed on the display section is watched by the user; and
output a process result to the user based on an intent interpretation result and the candidate list in the case where the at least one attribute information associated with the voice input and displayed by the display section is selected as the input in the non-voice input section, wherein
the intent interpretation result is a result of an interpretation of an intent of the voice recognition result based on the related information,
the process result is output as visual information in association with first voice information based on the determination that the display information is watched by the user, and
the process result is output as second voice information different from the first voice information based on the determination that the display information is not watched by the user.

* * * * *